US012598427B2

(12) United States Patent
Sung

(10) Patent No.: US 12,598,427 B2
(45) Date of Patent: Apr. 7, 2026

(54) VIBRATION APPARATUS AND DISPLAY APPARATUS INCLUDING THE SAME

(71) Applicant: LG Display Co., Ltd., Seoul (KR)

(72) Inventor: Seunghyun Sung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 211 days.

(21) Appl. No.: 18/385,627

(22) Filed: Oct. 31, 2023

(65) Prior Publication Data

US 2024/0205612 A1 Jun. 20, 2024

(30) Foreign Application Priority Data

Dec. 14, 2022 (KR) ........................ 10-2022-0175043

(51) Int. Cl.

*H04R 17/00* (2006.01)
*H04R 1/02* (2006.01)
*H04R 7/06* (2006.01)

(52) U.S. Cl.

CPC ............. *H04R 17/00* (2013.01); *H04R 1/028* (2013.01); *H04R 7/06* (2013.01); *H04R 2499/15* (2013.01)

(58) Field of Classification Search

CPC .......... H04R 17/00; H04R 1/028; H04R 7/06; H04R 2499/15

See application file for complete search history.

(56) References Cited

U.S. PATENT DOCUMENTS

| | | | | |
|---|---|---|---|---|
| 4,449,019 | A | 5/1984 | Kakehi et al. | |
| 2021/0366456 | A1* | 11/2021 | Jeong | G06F 1/1605 |
| 2022/0371052 | A1* | 11/2022 | Kim | H04R 1/2803 |
| 2023/0076553 | A1* | 3/2023 | Kim | G06V 40/1318 |
| 2024/0023451 | A1* | 1/2024 | Narubayashi | H10N 30/057 |
| 2024/0260476 | A1* | 8/2024 | Miyoshi | H10N 30/88 |

FOREIGN PATENT DOCUMENTS

KR 10-2014-0085979 A 7/2014

* cited by examiner

*Primary Examiner* — Mark Fischer

(74) *Attorney, Agent, or Firm* — Birch, Stewart, Kolasch & Birch, LLP

(57) ABSTRACT

A vibration apparatus includes a first cover member, a second cover member, and a vibration part disposed between the first cover member and the second cover member. The vibration part includes a vibration layer including a plurality of first portions and a second portion disposed between the plurality of first portions. The plurality of first portions can include a transparent single crystalline piezoelectric material, and the second portion can include a transparent organic material. The vibration part can further include a first electrode layer disposed at a first surface of the vibration layer, and a second electrode layer disposed at a second surface of the vibration layer being different from the first surface of the vibration layer.

19 Claims, 6 Drawing Sheets

VIBRATION APPARATUS AND DISPLAY APPARATUS INCLUDING THE SAME

CROSS-REFERENCE TO RELATED APPLICATIONS

This application claims priority to Korean Patent Application No. 10-2022-0175043 filed on Dec. 14, 2022 in the Republic of Korea, which is hereby fully incorporated by reference as if fully set forth herein into the present application.

BACKGROUND

Technical Field

The present disclosure relates to a vibration apparatus and a display apparatus including the same.

Description of the Related Art

Recently, a need for slim and thin electronic devices is increasing. For instance, when audio speakers are applied to electronic devices or the like, use of voice coils may not be suitable since it may be challenging to keep the electronic devices slim and thin. As such, piezoelectric elements capable of realizing a thin thickness are attracting much attention.

Speakers or vibration apparatuses with a piezoelectric element applied thereto can be driven or vibrated by a driving power or a driving signal supplied through a signal supply member.

SUMMARY OF THE DISCLOSURE

The inventor of the present disclosure has recognized that a single crystalline piezoelectric material can be transparent since there is no grain boundary and transparency can be enhanced by alternating current poling, see Qiu et al., "Transparent ferroelectric crystals with ultrahigh piezoelectricity", Nature 577, 350-354 (2020) (hereinafter referred to as a "reference document").

Through various research and experiments performed based on technology for implementing a transparency of a single crystalline piezoelectric material disclosed in the reference document, the inventor of the present disclosure has invented a vibration apparatus having a new structure and a display apparatus including the same, in which a piezoelectric characteristic is not reduced and the transparency is enhanced.

Accordingly, one or more aspects of the present disclosure are directed to providing a vibration apparatus and a display apparatus including the same, in which a piezoelectric characteristic is not reduced and the transparency thereof is enhanced.

One or more aspects of the present disclosure are directed to providing a display apparatus which can output a sound on the basis of a vibration of a display panel without a reduction in the transparency of the display panel.

Additional features and aspects will be set forth in part in the description that follows, and in part will become apparent from the description, or can be learned by practice of the inventive concepts provided herein. Other features and aspects of the inventive concepts can be realized and attained by the structure particularly pointed out in the written description, or derivable therefrom, and the claims hereof as well as the appended drawings.

To achieve these and other aspects of the present disclosure, as embodied and broadly described herein, a vibration apparatus comprises a first cover member, a second cover member, and a vibration part disposed between the first cover member and the second cover member. The vibration part comprises a vibration layer including a plurality of first portions including a transparent single crystalline piezoelectric material, and a second portion including a transparent organic material and disposed between the plurality of first portions. Further, the vibration part further comprises a first electrode layer at a first surface of the vibration layer, and a second electrode layer at a second surface of the vibration layer being different from the first surface of the vibration layer.

In one or more aspects, a display apparatus comprises a vibration member configured to vibrate a display panel, where the vibration member comprises a vibration apparatus. The vibration apparatus comprises a first cover member, a second cover member, and a vibration part between the first cover member and the second cover member. Further, the vibration part comprises a vibration layer including a plurality of first portions including a transparent single crystalline piezoelectric material, and a second portion including a transparent organic material and disposed between the plurality of first portions. The vibration part further comprises a first electrode layer at a first surface of the vibration layer, and a second electrode layer at a second surface of the vibration layer being from the first surface of the vibration layer.

According to one or more embodiments of the present disclosure, a piezoelectric characteristic of a vibration apparatus may not be reduced, and a transparency of the vibration apparatus can be enhanced.

According to one or more embodiments of the present disclosure, a sound can be output based on a vibration of a display panel without a reduction in the transparency of the display panel.

According to one or more embodiments of the present disclosure, a signal supply member can be connected to a vibration part without a soldering process, and thus, a hazard process can be improved.

According to one or more embodiments of the present disclosure, as a signal supply member and a vibration generating part are provided as one body, the signal supply member and the vibration generating part can be configured as one part, and thus, an effect of uni-materialization can be obtained.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain principles of the disclosure.

Figure 1:
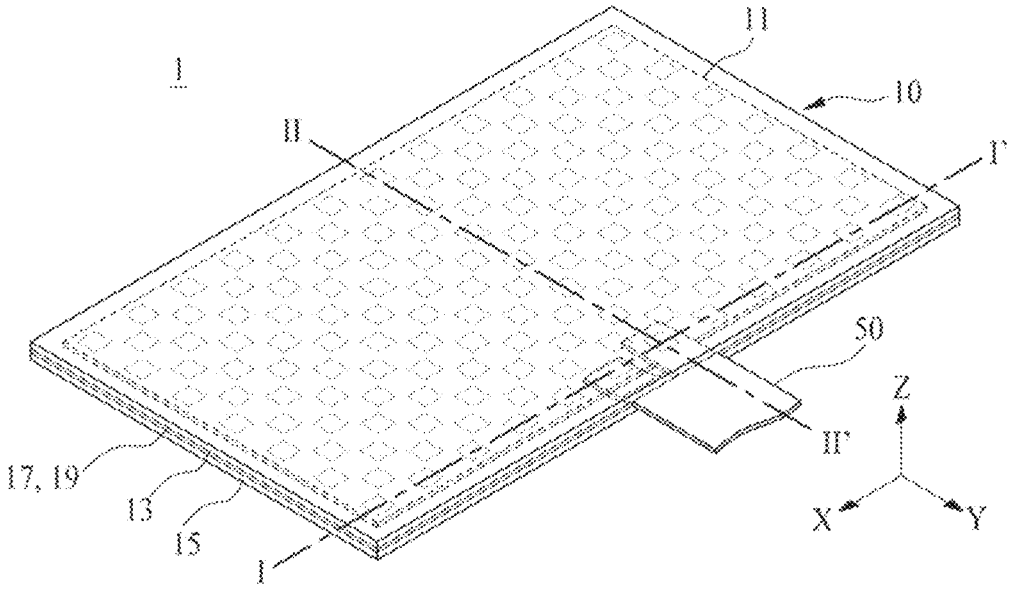
FIG. 1 illustrates a vibration apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTION OF THE EMBODIMENTS

Reference is now made in detail to embodiments of the present disclosure, examples of which can be illustrated in the accompanying drawings. In the following description, when a detailed description of well-known functions, structures or configurations can unnecessarily obscure aspects of the present disclosure, the detailed description thereof can have been omitted for brevity. Further, repetitive descriptions can be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure can, however, be embodied in different forms and should not be construed as limited to the embodiments set forth herein. Rather, these embodiments are examples and are provided so that this disclosure can be thorough and complete to assist those skilled in the art to understand the inventive concepts without limiting the protected scope of the present disclosure.

Shapes (e.g., sizes, lengths, widths, heights, thicknesses, locations, radii, diameters, and areas), ratios, angles, numbers, and the like disclosed herein, including those illustrated in the drawings are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

When the term "comprise," "have," "include," "contain," "constitute," "make of," "formed of," or the like is used with respect to one or more elements, one or more other elements can be added unless a term such as "only" or the like is used. The terms used in the present disclosure are merely used in order to describe example embodiments, and are not intended to limit the scope of the present disclosure. The terms of a singular form can include plural forms unless the context clearly indicates otherwise.

The word "exemplary" is used to mean or serve as an example or illustration. Aspects are example aspects. "Embodiments," "examples," "aspects," and the like should not be construed as preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). For instance, the term "about" present before a number includes that exact number as well as a range of numbers around that number. In interpreting a numerical value, the value is interpreted as including an error range unless explicitly stated otherwise.

In describing a positional relationship, where the positional relationship between two parts (e.g., layers, films, regions, components, sections, or the like) is described, for example, using "on," "upon," "on top of," "over," "under,"

"above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used. For example, when a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like a case that is not consecutive or not sequential can be included and thus one or more other events may occur therebetween, unless a more limiting term, such as "just," "immediate(ly)," or "direct(ly)" is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first," "second," or the like can be used herein to describe various elements (e.g., layers, films, regions, components, sections, or the like), these elements should not be limited by these terms. These terms are used only to distinguish one element from another. For example, a first element could be a second element, and, similarly, a second element could be a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element may not be only directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other, and can be meant as lines or directions having wider directivities within the range within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any of A, B, and C (e.g., A, B, or C); or some combination of A, B, and C (e.g., A and B; A and C; or B and C); or all of A, B, and C. Furthermore, an expression "A/B" can be understood as A and/or B. For example, an expression "A/B" can refer to only A; only B; A or B; or A and B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" can be used interchangeably simply for convenience unless stated otherwise. For example, an expression "different from each other" can be understood as being different from one another. In another example, an expression "different from one another" can be understood as being different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure can be partially or entirety coupled to or combined with each other, may be technically associated with each other, and can be variously inter-operated, linked or driven together. The embodiments of the present disclosure can be implemented or carried out independently of each other, or can be implemented or carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings can be different from an actual scale, dimension, size, and thickness, and thus, embodiments of the present disclosure are not limited to a scale, dimension, size, and thickness illustrated in the drawings.

Figure 2:
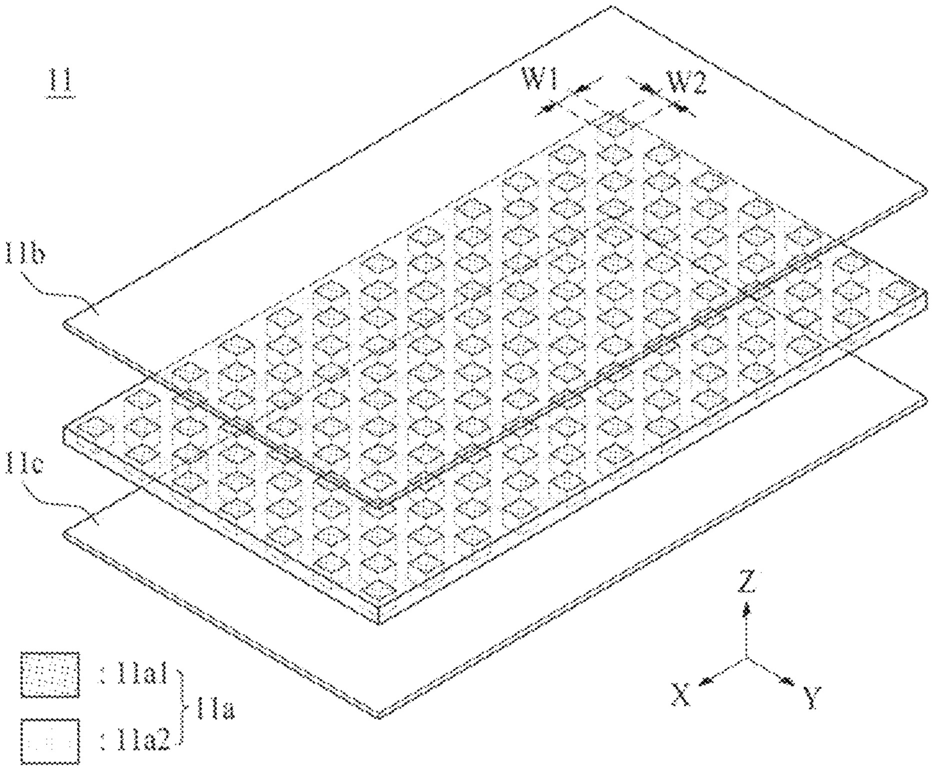
FIG. 2 illustrates a vibration part illustrated in FIG. 1.
Figure 3:
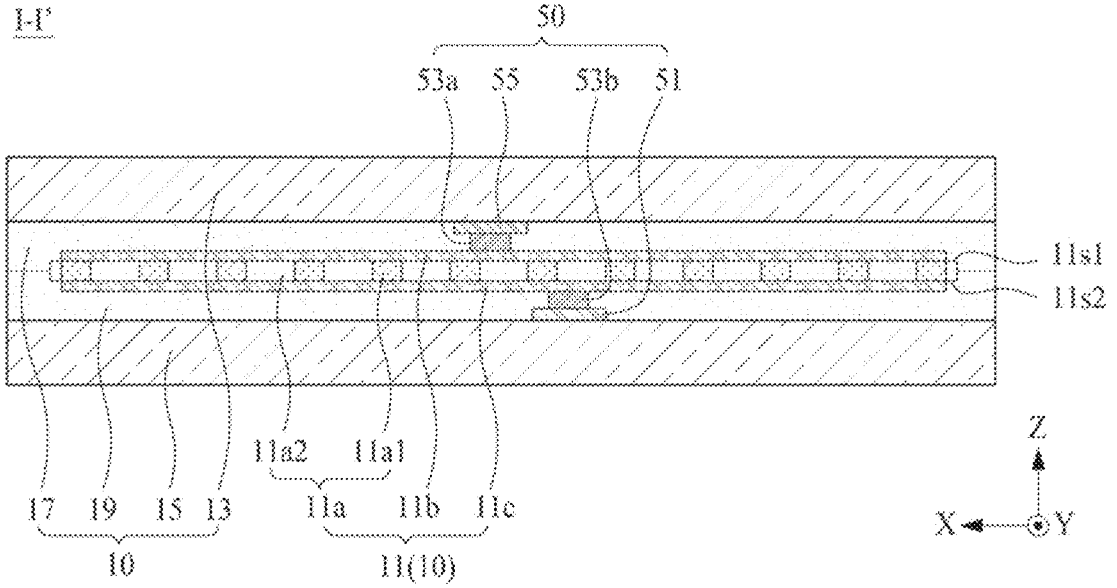
FIG. 3 is a cross-sectional view taken along line I-I' of FIG. 1.
Figure 4:
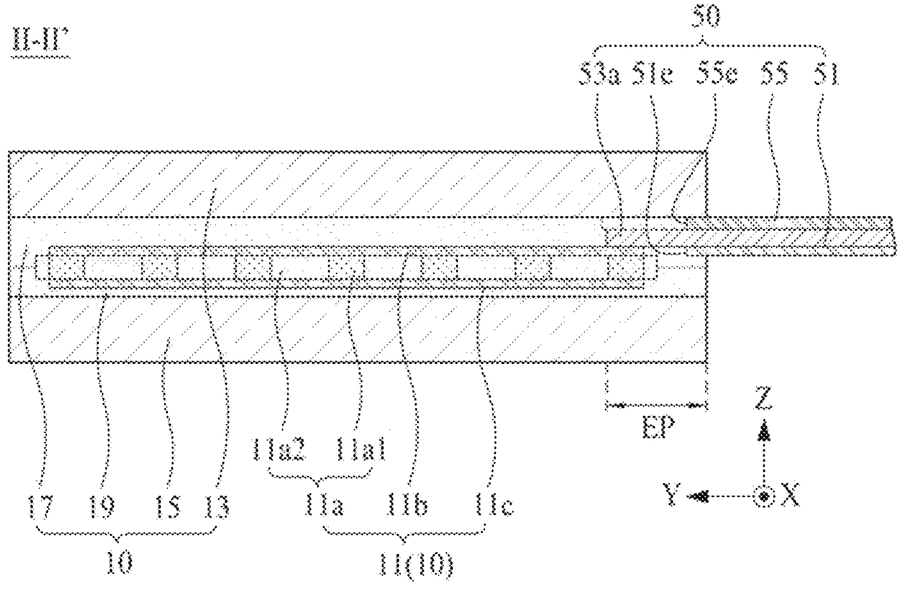
FIG. 4 is a cross-sectional view taken along line II-II' of FIG. 1.

FIG. 1 illustrates a vibration apparatus according to an embodiment of the present disclosure. FIG. 2 illustrates a vibration part illustrated in FIG. 1. FIG. 3 is a cross-sectional view taken along line I-I' of FIG. 1. FIG. 4 is a cross-sectional view taken along line II-II' of FIG. 1.

Referring to FIGS. 1 to 4, a vibration apparatus 1 according to an embodiment of the present disclosure can include a vibration generating part 10. For example, the vibration generating part 10 can be a transparent vibration apparatus or part.

The vibration generating part 10 can be configured to vibrate based on a driving signal (or a sound signal or a voice signal). For example, the vibration generating part 10 can be a vibration device, a vibration generating device, a vibration film, a vibration generating film, a vibrator, a vibration generator, an active vibrator, an active vibration generator, or an active vibration member, or the like, but embodiments of the present disclosure are not limited thereto.

The vibration generating part 10 according to an embodiment of the present disclosure can include a vibration part 11. The vibration generating part 10 or the vibration part 11 can alternately and repeatedly contract and expand based on a piezoelectric effect (or a piezoelectric characteristic) to vibrate. The vibration generating part 10 or the vibration part 11 can alternately and repeatedly contract and expand based on an inverse piezoelectric effect to vibrate in a thickness direction, e.g., Z-direction. For example, or the vibration part 11 can be a piezoelectric device, a piezoelectric device part, a piezoelectric device layer, a piezoelectric structure, a piezoelectric vibration part, or a piezoelectric vibration layer or the like, but embodiments of the present disclosure are not limited thereto.

The vibration part 11 can include a single crystalline piezoelectric material. The single crystalline piezoelectric material can include a structure where particles having a single crystal domain having a constant structure are regularly arranged. The single crystalline piezoelectric material can be about twice or three times higher in vibration characteristic (for example, piezoelectric strain constant d33) than a polycrystalline piezoelectric material, and thus, can have a high sound pressure level characteristic (or sound characteristic) in a low-pitched sound band. In addition, the single crystalline piezoelectric material can have a transparency of 80% or more because there is no grain boundary.

The vibration generating part 10 or the vibration part 11 according to an embodiment of the present disclosure can include a vibration layer 11*a*, a first electrode layer 11*b*, and a second electrode layer 11*c*.

The vibration layer 11*a* can include a piezoelectric material or an electroactive material which includes a piezoelectric effect. For example, the piezoelectric material can have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 11*a* can be referred to as a piezoelectric layer, a piezoelectric material layer, an electroactive layer, a piezoelectric composite layer, a piezoelectric composite, or a piezoelectric ceramic composite, or the like, but embodiments of the present disclosure are not limited thereto. For example, the vibration layer 11*a* can have a 1-3 composite structure.

The vibration layer 11*a* according to an embodiment of the present disclosure can include a plurality of first portions 11*a*1 and a second portion 11*a*2.

The plurality of first portions 11*a*1 can be disposed at a predetermined interval along a first direction (e.g., X-direction) and a second direction (e.g., Y-direction) intersecting with the first direction X. For example, the plurality of first portions 11*a*1 can be disposed at a predetermined interval along a first direction and a second direction Y on the same plane. For example, the plurality of first portions 11*a*1 can be disposed at an equal interval on the same plane, but embodiments of the present disclosure are not limited thereto. In one case, the first and second portions 11*a*1 and 11*a*2 can be alternatingly disposed. For example, the plurality of first portions 11*a*1 can be disposed in various pattern shapes within a range spaced apart from one another along the first direction X and the second direction Y. For example, the plurality of first portions 11*a*1 can be arranged in a lattice shape, a check shape, or a zigzag shape, or the like. For example, the first direction X can be a horizontal direction (or a widthwise direction) of the vibration apparatus 1 or the vibration layer 11*a*, and the second direction Y can be a vertical direction (or a lengthwise direction) of the vibration layer 11*a* intersecting with the first direction X, but embodiments of the present disclosure are not limited thereto. For example, the first direction X can be the vertical direction (or the lengthwise direction) of the vibration layer 11*a*, and the second direction Y can be the horizontal direction (or the widthwise direction) of the vibration layer 11*a*.

Each of the plurality of first portions 11*a*1 can include an inorganic material having a piezoelectric effect (or a piezoelectric characteristic). For example, each of the plurality of first portions 11*a*1 can include a piezoelectric material, a composite piezoelectric material, or an electroactive material. For example, each of the plurality of first portions 11*a*1 can be a single crystalline piezoelectric layer, a single crystalline piezoelectric part, an inorganic part, an inorganic material part, a piezoelectric material part, or an electroactive part, but embodiments of the present disclosure are not limited thereto.

Each of the plurality of first portions 11*a*1 can be configured as a single crystalline piezoelectric material or a single crystalline piezoelectric ceramic material.

Each of the plurality of first portions 11*a*1 according to an embodiment of the present disclosure can be configured as $\alpha$-$AlPO_4$, $\alpha$-$SiO_2$, $LiNbO_3$, $Tb_2(MoO_4)_3$, $Li_2B_4O_7$, $Bi_{12}SiO_2O$, $Bi_{12}GeO_2O$, or the like, but embodiments of the present disclosure are not limited thereto.

Each of the plurality of first portions 11*a*1 according to another embodiment of the present disclosure can be configured as a ceramic-based material have a capable of implementing a relatively strong vibration, or can be configured as a piezoelectric ceramic having a perovskite-based crystalline structure. The perovskite crystalline structure can have a piezoelectric effect and/or an inverse piezoelectric effect, and can be a plate-shaped structure having an orientation. For example, Each of the plurality of first portions 11*a*1 according to another embodiment of the present disclosure can be configured as a lead magnesium niobate-lead titanate (PMN-PT) including lead (Pb), magnesium (Mg), niobium (Nb), lead (Pb), and titanium (Ti), a lead indium niobate-lead magnesium niobate-lead titanate (PIN-PMN-PT) including lead (Pb), indium (In), niobium (Nb), lead (Pb), magnesium (Mg), niobium (Nb), lead (Pb), and titanium (Ti), a lead magnesium niobate-lead zirconate titanate (PMN-PZT) including lead (Pb), magnesium (Mg), niobium (Nb), lead (Pb), zirconium (Zr), and titanium (Ti), or a lead zinc niobate-lead titanate (PZN-PT) including lead (Pb), zirconium (Zr), niobium (Nb), lead (Pb), and titanium (Ti), or the like, but embodiments of the present disclosure are not limited thereto.

A surface of each of the plurality of first portions 11*a*1 according to an embodiment of the present disclosure can have a surface illuminance (or surface roughness) of 2 μm or less, based on a surface processing process. Therefore, the diffuse reflection of light or scattering of light at a surface of each of the plurality of first portions 11*a*1 can be minimized or reduced, and thus, a transparency of each of the plurality of first portions 11*a*1 can be more enhanced. For example, the surface processing process can include a polishing process or a physical polishing process using a lubricant and an abrasive (or a polishing pad). For example, the surface processing process can include a polishing process or a physical polishing process on a single crystalline block (or a single crystalline element) separated (or cut) from a single crystalline piezoelectric mother substrate (or a single crystalline piezoelectric ingot) including a single crystalline piezoelectric material. Each of the plurality of first portions 11*a*1 can be a portion separated (or cut) from a single crystalline block (or a single crystalline element) on which surface processing has been performed by the surface processing process.

According to an embodiment of the present disclosure, each of a first surface (or a front surface) and a second surface (or a rear surface), which is opposite to the first surface, of each of the plurality of first portions 11*a*1 can have a surface illuminance (or surface roughness) of 2 μm or less, based on the surface processing process. As a variation, the first and second surfaces here can be different surfaces. Each of the first surface (or the front surface), the second surface (or the rear surface), and one or more side surface of each of the plurality of first portions 11*a*1 can have a surface illuminance (or surface roughness) of 2 μm or less, based on the surface processing process. For example, all surfaces of each of the plurality of first portions 11*a*1 can have a surface illuminance (or surface roughness) of 2 μm or less.

Each of the plurality of first portions 11*a*1 according to an embodiment of the present disclosure can have a polygonal shape, a circular shape, an oval shape or the like, but embodiments of the present disclosure are not limited thereto. For example, each of the plurality of first portions 11*a*1 can have a first width W1 parallel to the first direction X and a second width W2 parallel to the second direction Y intersecting with the first direction X. The first width W1 can be a same as the second width W2, and thus, each of the plurality of first portions 11*a*1 can include a hexahedral (or a six-sided object) structure having a square shape. For example, the first width W1 can be different from the second width W2, and thus, each of the plurality of first portions 11*a*1 can include a hexahedral (or a six-sided object) structure having a rectangular shape.

The second portion 11*a*2 can be disposed between the plurality of first portions 11*a*1. The second portion 11*a*2 can be disposed between the plurality of first portions 11*a*1 along each of the first direction X and the second direction Y. The second portion 11*a*2 can be configured to fill a gap between two adjacent first portions 11*a*1 or to surround side surfaces of each of the plurality of first portions 11*a*1 along each of the first direction X and the second direction Y, and thus, the second portion 11*a*2 can be connected to or attached on the first portion 11*a*1 adjacent thereto. According to an embodiment of the present disclosure, each of the plurality of first portions 11*a*1 and the second portion 11*a*2 can be disposed (or arranged) at the same plane (or the same layer) in parallel with each other. Therefore, the vibration apparatus 1 or the vibration layer 11*a* can be expanded to a desired size or length by a lateral coupling (or connection) of the first portion 11*a*1 and the second portion 11*a*2.

According to an embodiment of the present disclosure, the second portion 11*a*2 can absorb an impact applied to the first portions 11*a*1, and thus, can enhance the durability of the first portions 11*a*1 and provide flexibility to the vibration layer 11*a*. The second portion 11*a*2 can include an organic material or a transparent organic material having a ductile characteristic. For example, the second portion 11*a*2 can include one or more of an epoxy-based polymer, an acrylic-based polymer, and a silicone-based polymer, but embodiments of the present disclosure are not limited thereto. For example, the second portion 11*a*2 can be an organic portion, an organic material portion, an adhesive portion, a stretch portion, a bending portion, a damping portion, or a ductile portion, but embodiments of the present disclosure are not limited thereto.

The first electrode layer 11*b* can be disposed at a first surface (or an upper surface or a front surface) 11*s*1 of the vibration layer 11*a*. The first electrode layer 11*b* can have a same size as the vibration layer 11*a*, or can have a size which is smaller than the vibration layer 11*a*. For example, the first electrode layer 11*b* can have a same shape as the vibration layer 11*a*, but embodiments of the present disclosure are not limited thereto. The first electrode layer 11*b* can be connected to the first surface 11*s*1 of each of the plurality of first portions 11*a*1 and the second portion 11*a*2 in common and can be electrically connected to the first surface 11*s*1 of each of the plurality of first portions 11*a*1.

The second electrode layer 11*c* can be disposed at a second surface (or a lower surface or a rear surface) 11*s*2 which is opposite to or different from the first surface 11*s*1 of the vibration layer 11*a*. The second electrode layer 11*c* can have a same size as the vibration layer 11*a*, or can have a size which is smaller than the vibration layer 11*a*. For example, the second electrode layer 11*c* can have a same shape as the first electrode layer 11*b* or the vibration layer 11*a*, but embodiments of the present disclosure are not limited thereto. The second electrode layer 11*c* can be connected to the second surface 11*s*2 of each of the plurality of first portions 11*a*1 and the second portion 11*a*2 in common and can be electrically connected to the second surface 11*s*2 of each of the plurality of first portions 11*a*1.

According to an embodiment of the present disclosure, in order to prevent electrical short circuit between the first electrode layer 11*b* and the second electrode layer 11*c*, each of the first electrode layer 11*b* and the second electrode layer 11*c* can be formed at the other portion, except a periphery portion, of the vibration layer 11*a*. For example, the first electrode layer 11*b* can be formed at an entire first surface 11*s*1, other than a periphery portion, of the vibration layer 11*a*. For example, the second electrode layer 11*c* can be formed at an entire second surface 11*s*2, other than a periphery portion, of the vibration layer 11*a*. For example, a distance between a lateral surface (or a sidewall) of each of the first electrode layer 11*b* and the second electrode layer 11*c* and a lateral surface (or a sidewall) of the vibration layer 11*a* can be at least 0.5 mm or more. For example, the distance between the lateral surface of each of the first electrode layer 11*b* and the second electrode layer 11*c* and the lateral surface of the vibration layer 11*a* can be at least 1 mm or more, but embodiments of the present disclosure are not limited thereto.

Each of the first electrode layer 11*b* and the second electrode layer 11*c* according to an embodiment of the present disclosure can be formed of a transparent conductive material. For example, each of the first electrode layer 11*b* and the second electrode layer 11*c* can include indium tin oxide (ITO) or indium zinc oxide (IZO), but embodiments of the present disclosure are not limited thereto.

The plurality of first portions 11*a*1 and the second portion 11*a*2 can be disposed on (or connected to) the same plane, and thus, the vibration generating part 10 or the vibration layer 11*a* according to an embodiment of the present disclosure can have a single thin film-type. Accordingly, the vibration part 11 or the vibration generating part 10 including the vibration layer 11*a* according to an embodiment of the present disclosure can vibrate in vertically (or up and down) direction by the plurality of first portion 11*a*1 having a vibration characteristic and can be bent in a curved shape by the second portion 11*a*2 having flexibility.

Each of the plurality of first portions 11*a*1 in the vibration layer 11*a* can be polarized (or poling) by an alternating current (AC) voltage (or an AC electric field) applied to the first electrode layer 11*b* and the second electrode layer 11*c* in a certain temperature atmosphere, or a temperature atmosphere that can be changed from a high temperature to a room temperature, but embodiments of the present disclosure are not limited thereto. For example, a polarization direction (or a poling direction) formed in each of the plurality of first portions 11*a*1 can be formed or aligned (or arranged) from the first electrode layer 11*b* to the second electrode layer 11*c*, but is not limited thereto, and a polarization direction (or a poling direction) formed in each of the plurality of first portions 11*a*1 can be formed or aligned (or arranged) from the second electrode layer 11*c* to the first electrode layer 11*b*. For example, a polarization direction formed in each of the plurality of first portions 11*a*1 can be a direction corresponding to a thickness direction Z of the vibration layer 11*a* in XYZ orientation coordinates. For example, a polarization vector direction between domain walls formed in each of the plurality of first portions 11*a*1 can be about 109 degrees, and thus, scattering of light occurring in the domain walls can be minimized, thereby increasing a transparency (or transmittance) of the first portion 11*a*1.

Each of the plurality of first portions 11*a*1 in the vibration layer 11*a*, as disclosed in the reference document, can have a transparency of about 80% or more without a reduction in piezoelectric characteristic, based on AC poling by an AC voltage (or an AC electric field).

According to an embodiment of the present disclosure, a transparency (or transmittance) deviation between each of the plurality of first portions 11*a*1 and the second portion 11*a*2 can be dispersed by an arrangement structure of the first portions 11*a*1 at the vibration layer 11*a*, thereby minimizing or preventing a reduction in visibility caused by a line-shaped stain occurring due to a transparency (or transmittance) deviation between the first portion 11*a*1 and the second portion 11*a*2.

The vibration layer 11*a* can alternately and repeatedly contract and/or expand based on an inverse piezoelectric effect according to a driving signal (or a sound signal or a vibration signal) applied to the first electrode layer 11*b* and the second electrode layer 11*c* from the outside to vibrate. For example, the vibration layer 11*a* can vibrate in a vertical direction (or thickness direction) and in a planar direction by the signal applied to the first electrode layer 11*b* and the second electrode layer 11*c*. The vibration layer 11*a* can be displaced (or vibrated or driven) by contraction and/or expansion of the planar direction, thereby improving a sound characteristic and/or a sound pressure level characteristic of the vibration generating part 10 or the vibration apparatus 1.

The vibration apparatus 1 or the vibration generating part 10 according to an embodiment of the present disclosure can further include a first cover member 13 and a second cover member 15.

The first cover member 13 can be disposed at a first surface of the vibration part 11. For example, the first cover member 13 can be configured to cover the first electrode layer 11*b* of the vibration part 11. For example, the first cover member 13 can be configured to have a greater size than the vibration part 11. The first cover member 13 can be configured to protect the first surface and the first electrode layer 11*b* of the vibration part 11.

The second cover member 15 can be disposed at a second surface of the vibration part 11. For example, the second cover member 15 can be configured to cover the second electrode layer 11*c* of the vibration part 11. For example, the second cover member 15 can be configured to have a greater size than the vibration part 11, and can be configured to have a same size as the first cover member 13. The second cover member 15 can be configured to protect the second surface and the second electrode layer 11*c* of the vibration part 11.

Each of the first cover member 13 and the second cover member 15 according to an embodiment of the present disclosure can include a transparent material or a transparent substance. The first cover member 13 and the second cover member 15 can be formed of the same transparent material or transparent substance to have the same transparency (or transmittance). Each of the first cover member 13 and the second cover member 15 can be made of a transparent plastic material or a transparent glass material. Each of the first cover member 13 and the second cover member 15 can be configured as thin glass capable of being folded or bent. Each of the first cover member 13 and the second cover member 15 can include any one of polyimide (PI), polyethylene terephthalate (PET), polyurethane (PU), cyclo-olefin polymer (COP), triacetylcellulose (TAC) or a combination material thereof, but embodiments of the present disclosure are not limited thereto.

One or more of the first cover member 13 and the second cover member 15 according to an embodiment of the present disclosure can include a transparent adhesive member. For example, the transparent adhesive member can include an electrical insulation material which has adhesive properties and is capable of compression and decompression.

The first cover member 13 can be connected or coupled to the first surface of the vibration part 11 or the first electrode layer 11*b* by a first adhesive layer 17. For example, the first cover member 13 can be connected or coupled to the first surface or the first electrode layer 11*b* of the vibration part 11 by a film laminating process using the first adhesive layer 17.

The second cover member 15 can be connected or coupled to the second surface of the vibration part 11 or the second electrode layer 11*c* by a second adhesive layer 19. For example, the second cover member 15 can be connected or coupled to the second surface or the second electrode layer 11*c* of the vibration part 11 by a film laminating process using the second adhesive layer 19.

The first adhesive layer 17 and second adhesive layer 19 can be configured between the first cover member 13 and the second cover member 15 to surround the vibration part 11. For example, one or more of the first adhesive layer 17 and second adhesive layer 19 can be an adhesive layer configured between the first cover member 13 and the second cover member 15 to surround the vibration part 11. For example, one or more of the first adhesive layer 17 and second adhesive layer 19 can be configured to surround the vibration part 11.

Each of the first adhesive layer 17 and second adhesive layer 19 according to an embodiment of the present disclosure can include an electrically insulating material which has adhesiveness and is capable of compression and decompression. For example, the first adhesive layer 17 and the second adhesive layer 19 can be configured as a same transparent material or transparent substance to have the same transparency (or transmittance). For example, each of the first adhesive layer 17 and the second adhesive layer 19 can include an adhesive material such as an optically cleared adhesive (OCA), an optically cleared resin (OCR), a pressure sensitive adhesive (PSA), or the like, but embodiments of the present disclosure are not limited thereto. For example, each of the first adhesive layer 17 and the second adhesive layer 19 can include an epoxy resin, an acrylic resin, a silicone resin, or a urethane resin, but embodiments of the present disclosure are limited thereto.

The vibration apparatus 1 according to an embodiment of the present disclosure can further include a signal supply member 50.

The signal supply member 50 can be configured to supply the driving signal supplied from a vibration driving circuit to the vibration generating part 10. The signal supply member 50 can be configured to be electrically connected to the vibration part 11 at one side of the vibration generating part 10. The signal supply member 50 can be configured to be electrically connected to the first electrode layer 11*b* and the second electrode layer 11*c* of the vibration part 11.

An end portion (or a distal end portion) of the signal supply member 50 can be disposed at or inserted (or accommodated) into a portion between one periphery portion EP of the first cover member 13 and one periphery portion EP of the second cover member 15. The one periphery portion EP of the first cover member 13 and the one periphery portion EP of the second cover member 15 can accommodate or vertically (or up and down) cover the end portion (or the distal end portion) of the signal supply member 50. Accordingly, the signal supply member 50 can be integrated (or configured as one body) with the vibration generating part 10. For example, the vibration apparatus 1 according to an embodiment of the present disclosure can be a vibration apparatus in which the signal supply member 50 can be integrated. For example, the vibration apparatus 1 according to an embodiment of the present disclosure can be a transparent vibration apparatus in which the signal supply member 50 is integrated. For example, the signal supply member 50 can be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 50 according to an embodiment of the present disclosure can include a base member 51 and a plurality of signal lines 53*a* and 53*b*. For example, the signal supply member 50 can include a base member 51, a first signal line 53*a*, and a second signal line 53*b*.

The base member 51 can include a transparent or opaque plastic material. For example, the base member 51 can be implemented with any one or more of resins including a fluorine resin, a polyimide-based resin, a polyurethane-based resin, a polyester-based resin, a polyethylene-based resin, and a polypropylene-based resin, but embodiments of the present disclosure are not limited thereto.

The base member 51 can have a certain width along a first direction X and can extend long along a second direction Y intersecting with the first direction X.

The first and second signal lines 53*a* and 53*b* can be disposed at the first surface of the base member 51 in parallel with the second direction Y, and can be spaced apart from each other or electrically separated from each other along the first direction X. The first and second signal lines 53*a* and 53*b* can be disposed in parallel to each other at the first surface of the base member 51. For example, the first and second signal lines 53*a* and 53*b* can be implemented in a line shape by patterning of a metal layer (or a conductive layer) formed or deposited at the first surface of the base member 51.

The end portions (or the distal end portions) of the first and second signal lines 53*a* and 53*b* can be separated from each other, and thus, can be individually curved or bent.

The end portion (or the distal end portion) of the first signal line 53*a* can be electrically connected to the first electrode layer 11*b* of the vibration part 11. For example, the end portion of the first signal line 53*a* can be electrically connected to at least a portion of the first electrode layer 11*b* of the vibration part 11 at one periphery portion of the first cover member 13. For example, the end portion of the first signal line 53*a* can be electrically and directly connected to at least a portion of the first electrode layer 11*b* of the vibration part 11. For example, the end portion of the first signal line 53*a* can be directly connected to or directly contact the first electrode layer 11*b* of the vibration part 11. For example, the end portion of the first signal line 53*a* can be electrically connected to the first electrode layer 11*b* through a conductive double-sided tape. Accordingly, the first signal line 53*a* can supply a first driving signal, supplied from a vibration driving circuit, to the first electrode layer 11*b* of the vibration part 11.

The end portion of the second signal line 53*b* can be electrically connected to the second electrode layer 11*c* of the vibration part 11. For example, the end portion of the second signal line 53*b* can be electrically connected to at least a portion of the second electrode layer 11*c* of the vibration part 11 at one periphery portion of the second cover member 15. For example, the end portion of the second signal line 53*b* can be electrically and directly connected to at least a portion of the second electrode layer 11*c* of the vibration part 11. For example, the end portion of the second signal line 53*b* can be directly connected to or directly contact the second electrode layer 11*c* of the vibration part 11. For example, the end portion of the second signal line 53*b* can be electrically connected to the second electrode layer 11*c* through a conductive double-sided tape. Accordingly, the second signal line 53*b* can supply a second driving signal, supplied from a vibration driving circuit, to the second electrode layer 11*c* of the vibration part 11.

According to an embodiment of the present disclosure, the vibration part 11 can further include one or more first electrode lines (or first transparent electrode lines) formed at the first electrode layer 11*b*, and one or more second electrode lines (or second transparent electrodes lines) formed at the second electrode layer 11*c*. Each of the one or more first electrode lines and the one or more second electrode lines can be configured as a transparent conductive material. For example, one or more first electrode lines and one or more second electrode lines can be disposed to be staggered each other rather than overlapping each other. The end portion (or the distal end portion) of the first signal line 53*a* can be electrically connected to an end portion (or a distal end portion) of the one or more first electrode lines, and the end portion (or the distal end portion) of the second signal line 53*b* can be electrically connected to an end portion (or a distal end portion) of the one or more second electrode lines. The first driving signal can be supplied to the first electrode layer 11*b* of the vibration part 11 through the first signal line 53*a* and one or more first electrode lines, and the second driving signal can be supplied to the second electrode layer 11*c* of the vibration part 11 through the second signal line 53*b* and one or more second electrode lines.

The signal supply member 50 according to an embodiment of the present disclosure can further include an insulation layer 55.

The insulation layer 55 can be disposed at the first surface of the base member 51 to cover each of the first signal line 53*a* and the second signal line 53*b* other than the end portion (or one side) of the signal supply member 50. The insulation layer 55 can be a protective layer, a coverlay, a coverlay layer, a cover film, a cover insulation film, or solder mask, but embodiments of the present disclosure are not limited thereto.

An end portion (or one side) of the signal supply member 50 including an end portion (or one side) of the base member 51 can be inserted (or accommodated) between the first surface of the vibration part 11 and the first cover member 13 and can be inserted (or accommodated) and fixed between the first surface of the vibration part 11 and the first cover member 13 by the first adhesive layer 17. For example, the end portion (or one side) of the signal supply member 50 inserted between the first surface of the vibration part 11 and the first cover member 13 can be inserted (or accommodated) and fixed between the first surface of the vibration part 11 and the first cover member 13 or between the second surface of the vibration part 11 and the second cover member 15 by a film laminating process which uses the first adhesive layer 17 or the second adhesive layer 19. Accordingly, the end portion (or one side) of the first signal line 53*a* can be maintained with being electrically connected to the first electrode layer 11*b* of the vibration part 11, and the end portion (or one side) of the second signal line 53*b* can be maintained with being electrically connected to the second electrode layer 11*c* of the vibration part 11. In addition, the end portion (or one side) of the signal supply member 50 can be inserted (or accommodated) and fixed between the first surface of the vibration part 11 and the first cover member 13, and thus, a contact defect between the vibration part 11 and the signal supply member 50 caused by the movement of the signal supply member 50 can be prevented.

In the signal supply member 50 according to an embodiment of the present disclosure, each of the end portion (or one side) of the base member 51 and the end portion (or one side) of the insulation layer 55 can be removed. For example, each of the end portion of the first signal line 53*a* and the end portion of the second signal line 53*b* can be exposed at the outside without being supported or covered by the end portion of the base member 51 and the end portion (or one side) 55*a* of the insulation layer 55. For example, the end portion of the first signal line 53*a* and the end portion of the second signal line 53*b* can protrude (or extend) to have a certain length from an end 51*e* of the base member 51 or an end 55*e* of the insulation layer 55. Accordingly, each of the end portion of the first signal line 53*a* and the end portion of the second signal line 53*b* can be individually or independently bent.

The end portion (or one side) of the first signal line 53*a* which is not supported by each of an end portion (or one side) of the base member 51 and the end portion (or one side) 55*e* of the insulation layer 55 can be directly connected to or directly contact the first electrode layer 11*b* of the vibration part 11. The end portion (or one side) of the second signal line 53*b* which is not supported by each of an end portion (or one side) of the base member 51 and the end portion (or one side) 55*e* of the insulation layer 55 can be directly connected to or directly contact the second electrode layer 11*c* of the vibration part 11.

According to an embodiment of the present disclosure, a portion of the signal supply member 50 (or a portion of the base member) can be disposed or inserted (or accommodated) between the vibration part 11 and the first cover member 13, and thus, the signal supply member 50 can be integrated (or configured) as one body with the vibration generating part 10. Accordingly, the signal supply member 50 and the vibration generating part 10 can be configured as one part (or an element or a component), and thus, an effect of uni-materialization can be obtained.

In the vibration apparatus 1 according to an embodiment of the present disclosure, the first signal line 53*a* and the second signal line 53*b* of the signal supply member 50 can be integrated (or configured) as one body with the vibration generating part 10, and thus, a soldering process for an electrical connection between the vibration generating part 10 and the signal supply member 50 may not be needed, whereby a structure and a manufacturing process of the vibration apparatus 1 or a transparent vibration apparatus can be simplified, and thus, a hazard process can be improved.

A method of manufacturing the vibration generating part 10 according to an embodiment of the present disclosure will be described below.

The method of manufacturing the vibration generating part 10 can include a process of manufacturing a single crystalline piezoelectric material (or a single crystalline piezoelectric particle), a process (or a pre-process) of manufacturing a single crystalline piezoelectric mother substrate (or a single crystalline piezoelectric ingot), a cutting process, a surface processing process, a process of forming an electrode layer, an AC poling process, and a modularization process.

The process of manufacturing the single crystalline piezoelectric material will be described below.

The single crystalline piezoelectric material according to an embodiment of the present disclosure can be manufactured by a solid state crystal growth process. For example, the solid state crystal growth process can be a process which mixes powders such as ceramic, attaches a single crystalline seed thereon, and grows from a single crystal into a polycrystal through a sintering process. For example, the single crystalline seed can be BaTixZr(1-x)$O_3$, but embodiments of the present disclosure are not limited thereto.

To describe a method of manufacturing the single crystalline piezoelectric material by using the solid state crystal growth process, powders such as ceramic can be mixed, grinded, and fired. A firing temperature can be about 800° C., but is not limited thereto. In addition, secondary raw materials can be mixed and grinded. For example, the secondary raw material can be a lead (Pb) compensation raw material. Also, pellets can be manufactured and sintered. Also, by using a seed template (for example, poly-crystal), growth of a compound can be induced, and crystal growth and Pb compensation can be performed, thereby manufacturing the second vibration part. Crystal growth and Pb compensation can be performed for 200 hours or more at a temperature of 900° C. or more, but embodiments of the present disclosure are not limited thereto.

According to another embodiment of the present disclosure, the second vibration part can be formed by a Bridgman process. For example, the Bridgman process can be a process of melting all mixed powders including ceramic to a liquid state at a high temperature and growing single crystal from a small single crystal nucleus.

To describe a method of manufacturing the single crystalline piezoelectric material by using the Bridgman process, powders such as ceramic can be mixed, grinded, and melted. A melting temperature can be 1,300° C. to 1,700° C., but embodiments of the present disclosure are not limited thereto. Also, crystallization of a melted material can be induced while lowering a temperature, and thus, single crystal can be grown, thereby manufacturing the single crystalline piezoelectric material. A crystallization temperature can be 800° C. to 1,400° C., but embodiments of the present disclosure are not limited thereto.

Subsequently, the single crystalline piezoelectric mother substrate having a piezoelectric characteristic can be manufactured through a pre-process using the single crystalline piezoelectric material.

The pre-process according to an embodiment of the present disclosure can mix and dry a ceramic raw material, crystallize a crystalline structure through a firing process, and perform a molding process and a sintering process at least once, thereby manufacturing the single crystalline piezoelectric mother substrate having a plate shape. The sintering process can use heat, pressure, and spike plasma, but embodiments of the present disclosure are not limited thereto.

Subsequently, the single crystalline piezoelectric mother substrate can be cut by predetermined size units through a cutting process, and each of a cut plurality of single crystalline piezoelectric mother substrates can be manufactured by predetermined size units, thereby manufacturing the plurality of first portions 11*a*1. For example, the cutting process can be performed by at least one of a wire sawing process, a scribing process, a blade dicing process, a laser cutting process, a stealth dicing process, and a thermal laser separation (TLS) process, but embodiments of the present disclosure are not limited thereto.

Subsequently, the surface of each of the plurality of first portions 11*a*1 can be polished by a surface processing process. For example, the surface processing process can include a polishing process or a physical polishing process using a lubricant and an abrasive (or a polishing pad). Therefore, the surface of each of the plurality of first portions 11*a*1 can have a surface illuminance (or surface roughness) of 2 μm or less, based on the surface processing process. For example, the surface processing process can be performed on a single crystalline piezoelectric block which is cut from the single crystalline piezoelectric mother substrate, and in this case, each of the plurality of first portions 11*a*1 can be a portion separated (or cut) from a single crystalline block (or a single crystalline element) on which surface processing (or polishing) has been performed by the surface processing process.

Subsequently, a plurality of first portions 11*a*1 can be arranged (or disposed) at a predetermined interval in the first direction X and the second direction Y. A transparent organic material can be implanted into a gap space between the plurality of first portions 11*a*1 and can be cured, and thus, a plurality of second portions 11*a*2 surrounding lateral surfaces of each of the plurality of first portions 11*a*1 can be formed. Accordingly, the vibration layer 11*a* can be manufactured.

Subsequently, the first electrode layer 11*b* can be formed at a first surface of the vibration layer 11*a* by using a transparent conductive material, and the second electrode layer 11*c* can be formed at a second surface, which is opposite to the first surface, of the vibration layer 11*a*. Accordingly, the vibration part 11 can be manufactured.

Subsequently, polarization can be formed in each of the plurality of first portions 11*a*1 of the vibration layer 11*a* through a polarization process of applying an AC voltage (or AC electric field) to the first electrode layer 11*b* and the second electrode layer 11*c* in a certain temperature atmosphere or a temperature atmosphere that can be changed from a high temperature to a room temperature. Accordingly, as disclosed in the reference document, each of the plurality of first portions 11*a*1 can have a transparency of about 80% or more without a reduction in piezoelectric characteristic, based on AC poling by an AC voltage (or an AC electric field). For example, the AC voltage can be a unipolar pulse and a bipolar pulse such as an AC triangular wave in addition to a right-angled wave.

Subsequently, the first signal line 53*a* of the signal supply member 50 can be electrically connected to the first electrode layer 11*b* of the vibration part 11, and the second signal line 53*b* of the signal supply member 50 can be electrically connected to the second electrode layer 11*c* of the vibration part 11.

Subsequently, the first cover member 13 covering a portion of the signal supply member 50 and the first electrode layer 11*b* of the vibration part 11 and the second cover member 15 covering a portion of the signal supply member 50 and the second electrode layer 11*c* of the vibration part 11 can be formed, and thus, a post-process on the vibration apparatus 1 or the vibration generating part 10 can be completed. For example, the first cover member 13 and the second cover member 15 can be formed by a film laminating process using adhesive layers 17 and 19. For example, one edge portion EP of the first cover member 13 and the other edge portion EP of the second cover member 15 can accommodate or vertically cover an end portion (or a distal end portion) of the signal supply member 50. Accordingly, the signal supply member 50 can be provided as one body with the vibration generating part 10.

The vibration apparatus 1 according to an embodiment of the present disclosure can include the vibration layer 11*a* which includes the plurality of first portions 11*a*1 having transparency and the second portion 11*a*2 connected between the plurality of first portions 11*a*1, based on AC poling, and thus, a piezoelectric characteristic may not be reduced and transparency can be enhanced. In addition, the vibration apparatus 1 or a transparent vibration apparatus according to an embodiment of the present disclosure can include the plurality of first portions 11*a*1 on which surface processing has been performed, and thus, the diffuse reflection of light or scattering of light at a surface of each of the plurality of first portions 11*a*1 can be minimized or reduced, thereby more enhancing transparency. Moreover, in the vibration apparatus 1 or the transparent vibration apparatus according to an embodiment of the present disclosure, a transparency (or transmittance) deviation between each of the plurality of first portions 11*a*1 and the second portion 11*a*2 can be dispersed, thereby minimizing or preventing a reduction in visibility caused by a line-shaped stain occurring due to a transparency (or transmittance) deviation between the first portion 11*a*1 and the second portion 11*a*2.

Figure 5:
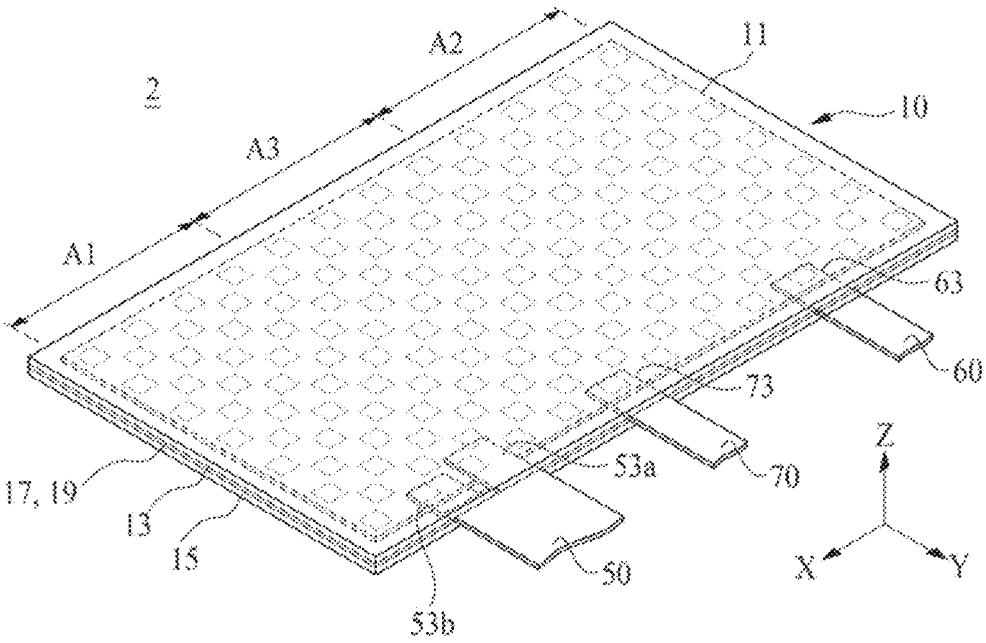
FIG. 5 illustrates a vibration apparatus according to another embodiment of the present disclosure.
Figure 6:
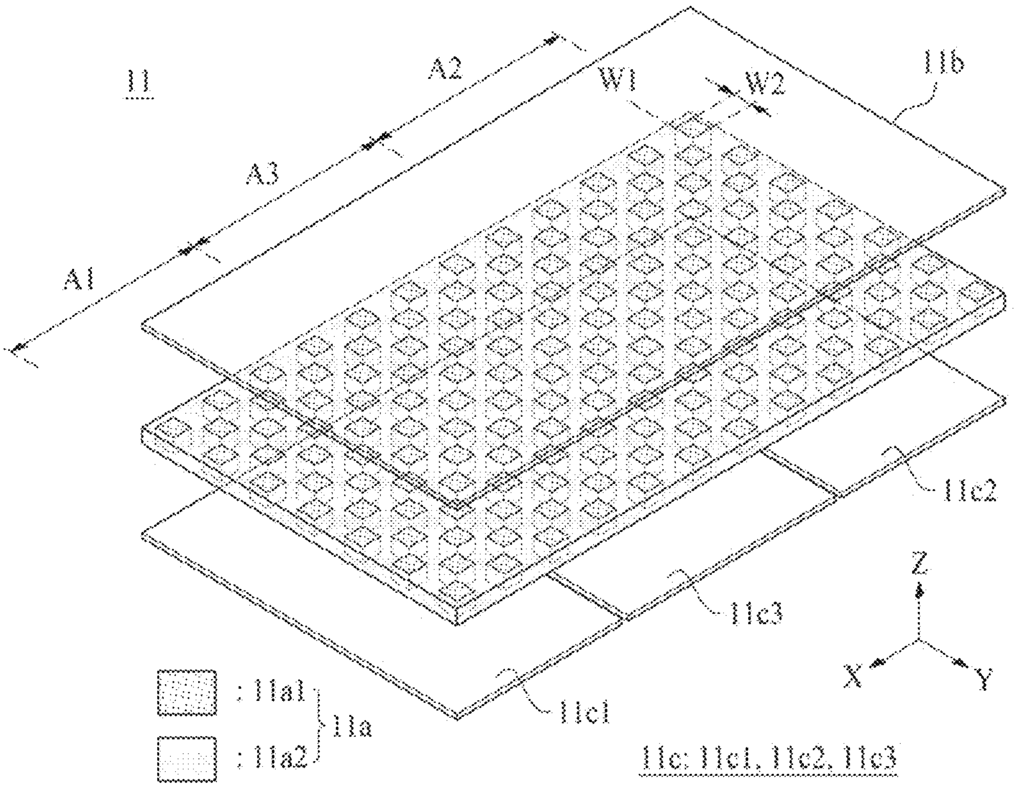
FIG. 6 illustrates a vibration part illustrated in FIG. 5.

FIG. 5 illustrates a vibration apparatus according to another embodiment of the present disclosure. FIG. 6 illustrates a vibration part illustrated in FIG. 5. Particularly, FIGS. 5 and 6 illustrate an embodiment implemented by modifying the second electrode layer in the vibration apparatus 1 described above with reference to FIGS. 1 to 4. A vibration apparatus 2 according to another embodiment of the present disclosure can include a plurality of second electrode layers, and thus, can differ from the vibration apparatus 1 according to an embodiment of the present disclosure. In the following description, like elements except the plurality of second electrode layers can be referred to by like reference numerals, and repeated descriptions thereof are omitted or will be briefly given.

Referring to FIGS. 5 and 6, in the vibration apparatus 2 according to another embodiment of the present disclosure, a vibration generating part 10 or a vibration part 11 can include a vibration layer 11*a*, a first electrode layer 11*b*, and a second electrode layer 11*c* including a plurality of sub-electrode layers 11*c*1 to 11*c*3. For example, the vibration apparatus 2 can be a transparent vibration apparatus.

The vibration layer 11*a* can be the same as or substantially the same as the vibration layer 11*a* described above with reference to FIGS. 1 to 4, and thus, repeated descriptions thereof are omitted or provided briefly.

The vibration layer 11*a* can include a plurality of regions A1, A2, and A3. For example, the vibration layer 11*a* can include a first region A1, a second region A2, and a third region A3 between the first region A1 and the second region A2. For example, the first region A1 can be a left region, the second region A2 can be a right region, and the third region A3 can be a middle region. One or more of the first region A1, the second region A2, and the third region A3 can have different sizes to each other, but embodiments of the present disclosure are not limited thereto. For example, the first region A1, the second region A2, and the third region A3 can have the same size or different sizes. For example, the first region A1 and the second region A2 can have the same size, and the third region A3 can have a size which is greater than each of the first region A1 and the second region A2.

A sound of one of a low-pitched sound band, a middle-pitched sound band, a high-pitched sound band, or a middle-high pitched sound band can be generated at each of the plurality of regions A1, A2, and A3. For example, the sound of one of a low-pitched sound band, a middle-pitched sound band, a high-pitched sound band, or a middle-high pitched sound band can be generated at each of the first region A1, the second region A2, and the third region A3. For example, the low-pitched sound band can be 200 Hz or less, the middle-pitched sound band can be 200 Hz to 3 kHz, and the high-pitched sound band can be 3 kHz or more, but embodiments of the present disclosure are not limited thereto.

According to an embodiment of the present disclosure, in the vibration layer 11*a*, sounds having the same pitched sound band can be generated or output from the first region A1, the second region A2, and the third region A3. Accordingly, the vibration apparatus 2 or the transparent vibration apparatus according to another embodiment of the present disclosure can output a stereophonic sound, based on the sound output from each of the first region A1, the second region A2, and the third region A3, and can have a 3-channel sound output characteristic.

According to another embodiment of the present disclosure, in the vibration layer 11*a*, sounds having different pitched sound bands can be generated or output from one or more of the first region A1, the second region A2, and the third region A3. For example, a sound of the low-pitched sound band can be generated or output from the third region A3, and a sound of a pitched sound band which is wider than the third region A3 can be generated or output from each of the first region A1 and the second region A2, but embodiments of the present disclosure are not limited thereto. For example, any one sound of the middle-pitched sound band, a high-pitched sound band, or a middle-high pitched sound band can be generated or output from each of the first region A1 and the second region A2. Accordingly, the vibration apparatus 2 or the transparent vibration apparatus according to another embodiment of the present disclosure can implement a sound, for example, a stereo sound by the sound output from each of the first region A1 and the second region A2, and a sound characteristic and/or a sound pressure level characteristic of the low-pitched sound band can be enhanced based on the sound of the low-pitched sound band output from the third region A3.

The first electrode layer 11*b* can be provided at a first surface of the vibration layer 11*a* and can be the same as or substantially the same as the first electrode layer 11*b* described above with reference to FIGS. 1 to 4, and thus, repeated descriptions thereof are omitted or provided briefly. The first electrode layer 11*b* can be disposed at a front surface of the vibration apparatus 2 and can be a common electrode corresponding to the plurality of first portions 11*a*1, but embodiments of the present disclosure are not limited thereto.

The second electrode layer 11*c* can be provided at a second surface of the vibration layer 11*a*. The second electrode layer 11*c* can include a plurality of sub-electrode layers (or division electrodes) 11*c*1, 11*c*2, and 11*c*3 overlapping the plurality of regions A1, A2, and A3 of the vibration layer 11*a*. For example, the second electrode layer 11*c* can include first to third sub-electrode layers (or division electrodes) 11*c*1, 11*c*2, and 11*c*3 overlapping the first to third regions A1, A2, and A3 of the vibration layer 11*a*.

The first sub-electrode layer 11*c*1 can be provided at the second surface of the vibration layer 11*a* corresponding to the first region A1 of the vibration layer 11*a*. The first sub-electrode layer 11*c*1 can be provided at the second surface of the vibration layer 11*a* which overlaps the first electrode layer 11*b* and corresponds to the first region A1 of the vibration layer 11*a*.

The second sub-electrode layer 11*c*2 can be provided at the second surface of the vibration layer 11*a* corresponding to the second region A2 of the vibration layer 11*a*. The second sub-electrode layer 11*c*2 can be provided at the second surface of the vibration layer 11*a* which overlaps the first electrode layer 11*b* and corresponds to the second region A2 of the vibration layer 11*a*.

The third sub-electrode layer 11*c*3 can be provided at the second surface of the vibration layer 11*a* corresponding to the third region A3 of the vibration layer 11*a*. The third sub-electrode layer 11*c*3 can be provided at the second surface of the vibration layer 11*a* which overlaps the first electrode layer 11*b* and corresponds to the third region A3 of the vibration layer 11*a*.

The same driving signal can be applied to a plurality of sub-electrode layers (for example, the first to third sub-electrode layers) 11*c*1, 11*c*2, and 11*c*3. Different driving signals can be applied to one or more of the plurality of sub-electrode layers (for example, the first to third sub-electrode layers) 11*c*1, 11*c*2, and 11*c*3. Accordingly, the first region A1, the second region A2, and the third region A3 of the vibration layer 11*a* can be individually or independently displaced (or vibrated) or simultaneously displaced (or vibrated) based on a driving signal applied to each of the first to third sub-electrode layers 11*c*1, 11*c*2, and 11*c*3.

The vibration apparatus 2 according to another embodiment of the present disclosure can further include a plurality of signal supply members 50, 60, and 70. The vibration apparatus 2 can include first to third signal supply members 50, 60, and 70.

The first signal supply member 50 can be configured to supply a first driving signal and a second driving signal, supplied from a vibration driving circuit, to the first electrode layer 11*b* and the first sub-electrode layer 11*c*1. The first signal supply member 50 can be electrically connected to the first electrode layer 11*b* and can be electrically connected to the first sub-electrode layer 11*c*1. The first signal supply member 50 can include a first signal line 53*a* electrically connected to the first electrode layer 11*b* and a second signal line 53*b* electrically connected to the first sub-electrode layer 11*c*1. Except for that the first signal supply member 50 is electrically connected to the first electrode layer 11*b* and the first sub-electrode layer 11*c*1, the first signal supply member 50 can be the same as or substantially the same as the signal supply member 50 described above with reference to FIGS. 1 to 4, and thus, repeated descriptions thereof are omitted or provided briefly.

The plurality of first portions 11*a*1 at the first region A1 of the vibration layer 11*a* can be displaced (or vibrated or driven) based on a first driving signal (or a common signal) applied to the first electrode layer 11*b* and a second driving signal applied to the first sub-electrode layer 11*c*1 through the first signal supply member 50, and thus, a sound or a vibration can be generated.

The second signal supply member 60 can be configured to supply a third driving signal, supplied from a vibration driving circuit, to the second sub-electrode layer 11*c*2. The second signal supply member 60 can be electrically connected to the second sub-electrode layer 11*c*2. The second signal supply member 60 can include a signal line 63 electrically connected to the second sub-electrode layer 11*c*2, but embodiments of the present disclosure are not limited thereto. The second signal supply member 60 can be configured to include a base member, a second signal line, and an insulation layer in the signal supply member 50 described above with reference to FIGS. 1 to 4, and thus, repeated descriptions thereof are omitted or provided briefly.

The plurality of first portions 11*a*1 at the second region A2 of the vibration layer 11*a* can be displaced (or vibrated or driven) based on a first driving signal (or a common signal) applied to the first electrode layer 11*b* through the first signal supply member 50 and a third driving signal applied to the second sub-electrode layer 11*c*2 through the second signal supply member 60, and thus, a sound or a vibration can be generated.

The third signal supply member 70 can be configured to supply a fourth driving signal, supplied from a vibration driving circuit, to the third sub-electrode layer 11*c*3. The third signal supply member 70 can be electrically connected to the third sub-electrode layer 11*c*3. The third signal supply member 70 can include a signal line 73 electrically connected to the third sub-electrode layer 11*c*3, but embodiments of the present disclosure are not limited thereto. The third signal supply member 70 can be configured to include a base member, a second signal line, and an insulation layer in the signal supply member 50 described above with reference to FIGS. 1 to 4, and thus, repeated descriptions thereof are omitted or provided briefly.

The plurality of first portions 11*a*1 at the third region A3 of the vibration layer 11*a* can be displaced (or vibrated or driven) based on a first driving signal (or a common signal) applied to the first electrode layer 11*b* through the first signal supply member 50 and a fourth driving signal applied to the third sub-electrode layer 11*c*3 through the third signal supply member 70, and thus, a sound or a vibration can be generated.

Similar to the signal supply member illustrated in FIG. 4, an end portion (or a distal end portion) of each of the first to third signal supply member 50, 60, and 70 can be disposed or inserted (or accommodated) between one periphery portion EP of the first cover member 13 and one periphery portion EP of the second cover member 15. The one periphery portion EP of the first cover member 13 and the one periphery portion EP of the second cover member 15 can accommodate or vertically cover the end portion (or the distal end portion) of each of the first to third signal supply member 50, 60, and 70. Accordingly, the end portion (or the distal end portion) of each of the first to third signal supply member 50, 60, and 70 can be integrated into the vibration generating part 10.

According to another embodiment of the present disclosure, the second and third signal supply members 60 and 70 can be integrated into the first signal supply member 50. In this case, the first signal supply member (or the signal supply member) 50 can include a first signal line (a common signal line) 53*a* configured to be electrically connected to the first electrode layer 11*b* and second to fourth signal lines (or first to third driving signal lines) 53*b*, 63, and 73 configured to be electrically and respectively connected to the first to third sub-electrode layers 11*c*1 to 11*c*3 of the second electrode layer 11*c*.

The vibration apparatus 2 or the transparent vibration apparatus according to another embodiment of the present disclosure can have a same effect as that of the vibration apparatus 2 or the transparent vibration apparatus according to another embodiment of the present disclosure described above with reference to FIGS. 1 to 4. In addition, the vibration apparatus 2 or the transparent vibration apparatus according to another embodiment of the present disclosure can generate or output sounds of different pitched sound bands from one or more of the first region A1, the second region A2, and the third region A3 of the vibration layer 11*a*, based on driving signals respectively applied to the first to third sub-electrode layers 11*c*1, 11*c*2, and 11*c*3 of the second electrode layer 11*c*, and thus, can output a stereo sound or a stereophonic sound and can have a sound output characteristic of 2 or more channels.

Figure 7:
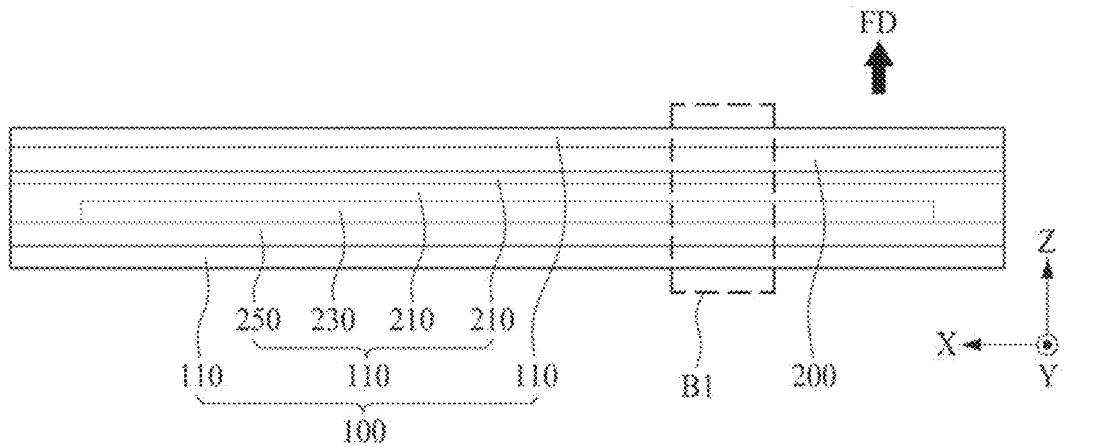
FIG. 7 illustrates a display apparatus including a vibration apparatus according to an embodiment of the present disclosure.
Figure 8:
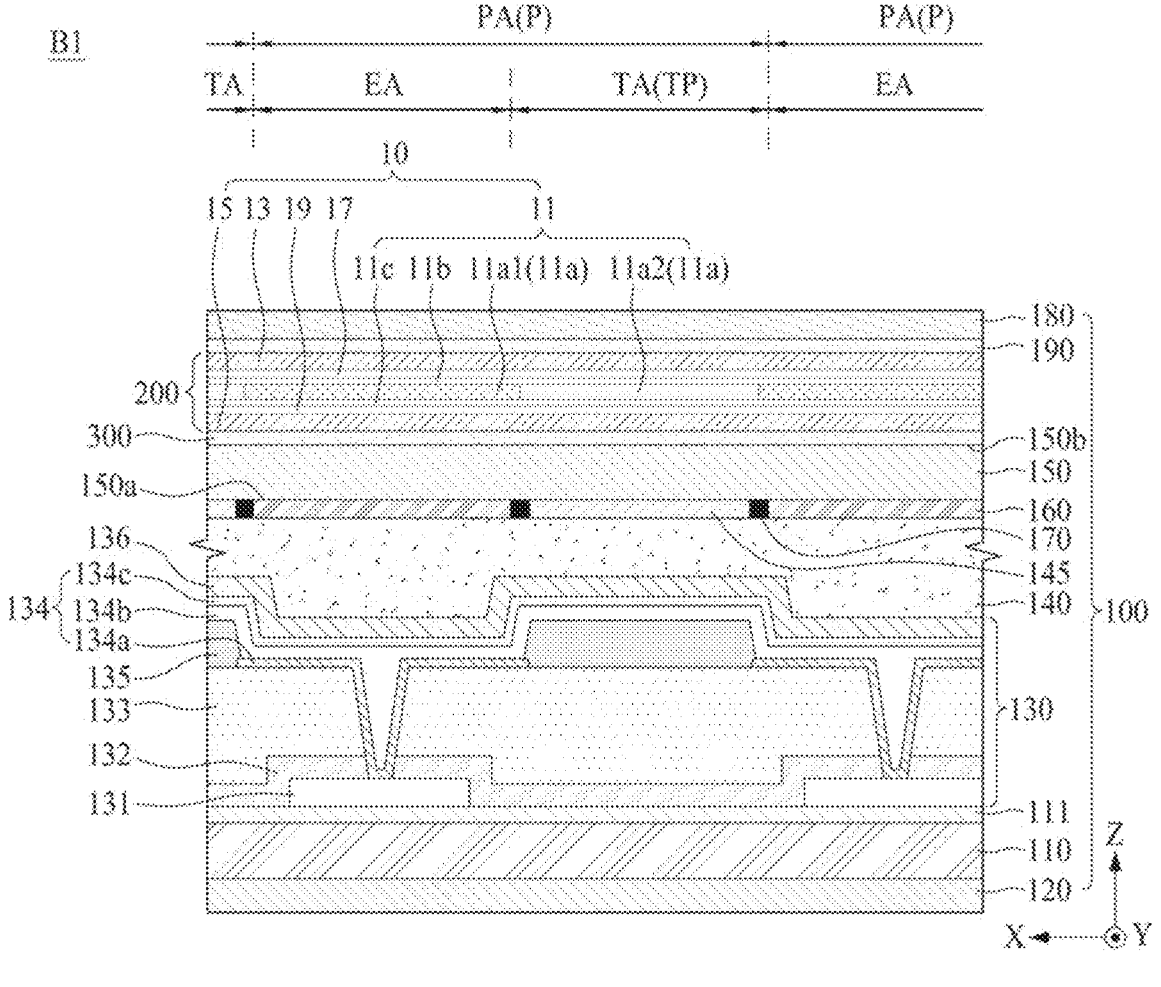
FIG. 8 is an enlarged view of a region 'B1' illustrated in FIG. 7.

FIG. 7 illustrates a display apparatus including a vibration apparatus according to an embodiment of the present disclosure. FIG. 8 is an enlarged view of a region 'B1' illustrated in FIG. 7, and is a cross-sectional view illustrating one subpixel provided at the display part of FIG. 7.

Referring to FIGS. 7 and 8, a display apparatus (or a transparent display apparatus) according to an embodiment of the present disclosure can be a wearable device, such as a head mount display, a smart watch, smart glass, or augmented reality (AR) glass or the like, or a transparent display such as a head up display, a window-type display, a smart show window, a smart mirror, a signage, a television, or a bidirectional information transfer display, but embodiments of the present disclosure are not limited thereto.

The display apparatus (or a transparent display apparatus) according to an embodiment of the present disclosure can include a display panel 100 and a vibration member 200.

The display panel 100 can be configured to display an image and can be configured to output one or more of a sound, a haptic feedback, and an ultrasound, based on a vibration of the vibration member 200. For example, the display panel 100 can be used as a vibration plate of the vibration member 200.

The display panel 100 can be any type of a transparent display panel or a curved transparent display panel, such as a transparent liquid crystal display panel, a transparent organic light-emitting display panel, a transparent quantum dot light-emitting display panel, a transparent micro light-emitting diode display panel, and a transparent electrophoresis display panel, or the like. For example, the display panel 100 can be a transparent flexible display panel. For example, the display panel 100 can be a transparent flexible light emitting display panel, a transparent flexible electrophoretic display panel, a transparent flexible electro-wetting display panel, a transparent flexible micro light emitting diode display panel, or a transparent flexible quantum dot light emitting display panel, but embodiments of the present disclosure are not limited thereto. For example, the display panel 100 can be a display panel which can generate or output a sound by vibrating by the vibration member 200 according to an embodiment of the present disclosure. Hereinafter, an example where the display panel 100 is a transparent organic light emitting display panel will be described.

The display panel 100 according to an embodiment of the present disclosure can include a base member 110, a display part 130, and a plate member 150.

The base member 110 can be configured as one or more of a glass material and a plastic material. For example, the base member 110 can be configured as a glass material or configured as thin glass capable of being folded or bent. For example, the base member 110 can include any one of polyimide (PI), polyethylene terephthalate (PET), polyurethane (PU), cyclo-olefin polymer (COP), triacetylcellulose (TAC) or a combination material thereof, but embodiments of the present disclosure are not limited thereto. For example, the base member 110 can be a base substrate, a first substrate, or a display substrate, but embodiments of the present disclosure are not limited thereto.

An entire of a first surface (or an inner surface) of the base member 110 can be covered by one or more buffer layers 111. The buffer layer 111 can prevent a material contained in the base member 110 from being diffused to a transistor layer during a high-temperature process of the fabricating process of the thin film transistor. In addition, the buffer layer 111 can prevent external water or moisture from being permeated into the light emitting device. For example, the buffer layer 111 can be configured as an inorganic material, but embodiments of the present disclosure are not limited thereto.

The display part 130 can be configured at the base member 110 or the buffer layer 111. The display part 130 can be configured at the base member 110 or the buffer layer 111 to display an image.

The display part 130 can include a plurality of pixels P configured to display an image based on signals supplied to signal lines configured at the base member 110 or the buffer layer 111. For example, the display part 130 can include a pixel array portion which is disposed at a pixel area PA provided by a plurality of gate lines and/or a plurality of data lines. The pixel array portion can include a plurality of pixels configured to display an image based on signals supplied to signal lines. The signal lines can include gate line, a data line, and a pixel driving power line or the like, but embodiments of the present disclosure are not limited thereto.

Each of the plurality of pixels P (or pixel areas PA) can include an emission region EA and a transmissive region TA adjacent to the emission region EA. The emission region EA can be an opening region, an emission portion, an opening portion, a circuit region, or a circuit portion, but embodiments of the present disclosure are not limited thereto. The transmissive region TA can be a non-emission region, a non-emission portion, a transparent opening portion, a transmissive portion, or a transparent portion. Each of the plurality of pixels P can be a minimum-unit region which actually emits light and can be defined as a subpixel. At least three adjacent pixels P can configure one unit pixel for displaying a color. For example, one unit pixel can include a red pixel, a green pixel, and a blue pixel adjacent to one another, and can further include a white pixel for luminance enhancement.

Each of the plurality of pixels P can be configured to display an image in a Top emission type, but embodiments of the present disclosure are not limited thereto. For example, each of the plurality of pixels P can be configured to display an image in a bottom emission type. Light generated from the pixels based on the top emission type can pass through the plate member 150 and can be emitted (or output) in a forward direction of the display panel 100. Light generated from the pixels based on the bottom emission type can pass through the base member 110 and can be emitted (or output) in a rearward direction of the display panel 100.

Each of the plurality of pixels P according to an embodiment of the present disclosure can include a pixel circuit 131, an overcoat layer 133, and a light emitting device layer (or a light emitting device) 134.

The pixel circuit 131 can be configured at the transmissive region TA of the pixel P together with the signal lines and can be connected with the gate line, the data line, and the pixel driving power line, which are adjacent thereto. The pixel circuit 131 can control a current flowing through the light emitting device layer 134 by a data signal from the data line in response to a scan pulse from the gate line, based on a pixel driving power supplied from the pixel driving power line. The pixel circuit 134 according to an embodiment of the present disclosure can include a switching thin film transistor (TFT), a driving TFT, and a capacitor, but embodiments of the present disclosure are not limited thereto.

A TFT can include a gate electrode, a gate insulating layer, a semiconductor layer, a source electrode, and a drain electrode. For example, the TFT can be an amorphous silicon (a-Si) TFT, a poly-Si TFT, an oxide TFT, or an organic TFT and the like, but embodiments of the present disclosure are not limited thereto.

The switching TFT can be turned on based on the scan pulse supplied through the gate line and can transfer a data signal, supplied through the data line, to the driving TFT. The capacitor can be provided at an overlap region between a gate electrode and a source electrode of the driving TFT and can store a voltage corresponding to the data signal supplied to the gate electrode of the driving TFT. The driving TFT can be turned on by a voltage supplied from the switching TFT and/or a voltage of the capacitor, and thus, can control the amount of current flowing from the pixel driving power line to the light emitting device layer 134. For example, the driving TFT can control a data current flowing from the pixel driving power line to the light emitting device layer 134, based on the data signal supplied from the switching TFT, and thus, can allow the light emitting device layer 134 to emit light having brightness corresponding to the data signal.

The display apparatus according to an embodiment of the present disclosure can further include a scan driving circuit (or a gate driving circuit) provided in a non-display part at a periphery of the display part 130 of the base member 100. The scan driving circuit can generate the scan pulse based on a gate control signal and can supply the scan pulse to the gate line. The scan driving circuit according to an embodiment of the present disclosure can be configured with a shift register including a transistor provided in the non-display part of the base member 110 which is formed by the same process as a TFT together with a TFT of the pixel P.

The pixel circuit 131 can be covered by a passivation layer 132. For example, the passivation layer 132 can be configured on the base member 110 to cover the pixel circuit 131. The passivation layer 132 can be configured as an inorganic material, but embodiments of the present disclosure are not limited thereto. For example, the passivation layer 132 can be omitted.

The overcoat layer 133 can be configured on the base member 110 to cover the pixel circuit 131. The overcoat layer 133 can be configured to provide a flat surface on the pixel circuit 131. For example, the overcoat layer 133 can be configured as an organic material, but embodiments of the present disclosure are not limited thereto. For example, the overcoat layer 133 can be a protection layer or a planarization layer, but the terms are not limited thereto.

The light emitting device layer 134 can be provided on the overcoat layer 133. The light emitting device layer 134 can include a pixel electrode **134*a*, a light emitting device 134*b*, and a common electrode 134*c***.

The pixel electrode **134*a* (or a reflective electrode) can be provided on the overcoat layer 133 corresponding to the emission region EA of each pixel area PA. For example, the pixel electrode 134*a* can be provided in a pattern shape. The pixel electrode 134*a* can be electrically connected to the driving TFT of the pixel circuit 131 through a contact hole provided at the overcoat layer 133. The pixel electrode 134*a* can include a metal material having a high reflectance so as to reflect light, which is emitted from the light emitting device 134*b* and is incident thereon, toward the plate member 150. The pixel electrode 134*a*** can be an anode electrode, but embodiments of the present disclosure are not limited thereto.

A periphery portion of the pixel electrode **134*a* can be covered by the bank layer 135. The bank layer 135 can be provided on the overcoat layer 133 to cover a periphery portion of each of the pixel circuit 131 and the pixel electrode 134*a***, and thus, can define (or divide) the emission region EA (or an opening region or a light extraction region) of each of the plurality of pixels P.

The light emitting device **134*b* can be formed or configured on the pixel electrode 134*a*. The light emitting device 134*b* can be configured to directly contact the pixel electrode 134***a*. For example, the light emitting device 134*b* can include an organic light emitting device or an inorganic light emitting device. For example, the light emitting device 134*b* can include one of an organic light emitting layer, an inorganic light emitting layer, and a quantum dot light emitting layer, or can include a stack or combination structure of an organic light emitting layer (or an inorganic light emitting layer) and a quantum dot light emitting layer.

The common electrode 134*c* (or a transparent electrode) can be configured to be connected to the light emitting device 134*b*, provided at each of the plurality of pixels P, in common. The common electrode 134*c* can configured at a transparent conductive material. For example, the common electrode 134*c* can be a cathode electrode, but embodiments of the present disclosure are not limited thereto.

The light emitting device 134*b* according to an embodiment of the present disclosure can be implemented so that pixels emit light of a same color (for example, white light) or emit lights of different colors (for example, red light, green light, and blue light). As an embodiment of the present disclosure, the light emitting device 134*b* can be a single structure including the same color for each pixel or a stack structure including two or more structures. As another embodiment of the present disclosure, the light emitting device 134*b* can be a stack structure including two or more structures including one or more different colors for each pixel. Two or more structures including one or more different colors can be configured in one or more of blue, red, yellow-green, and green, or a combination thereof, but embodiments of the present disclosure are not limited thereto. An example of the combination can include blue and red, red and yellow-green, red and green, and red/yellow-green/green, or the like, but embodiments of the present disclosure are not limited thereto. A stack structure including two or more structures having the same color or one or more different colors can further include a charge generating layer between two or more structures. The charge generating layer can have a PN junction structure and can include an N-type charge generating layer and a P-type charge generating layer.

The light emitting device 134*b* according to another embodiment of the present disclosure can include a micro light emitting diode device which is electrically connected to the pixel electrode 134*a* and the common electrode 134*c*. The micro light emitting diode device can be a light emitting diode implemented as an integrated circuit (IC) type or a chip type. The micro light emitting diode device can include a first terminal electrically connected to the pixel electrode 134*a* and a second terminal electrically connected to the common electrode 134*c*.

The display panel 100 or the display part 130 according to an embodiment of the present disclosure can further include an encapsulation layer 136.

The encapsulation layer 136 can be configured to surround or cover the display part 130. The encapsulation layer 136 can be configured to prevent external water or moisture from penetrating into a light emitting device layer. The encapsulation layer 136 can include an inorganic material layer or an organic material layer, or can be formed in a multi-layer structure where an inorganic material layer and an organic material layer are alternately stacked, but embodiments of the present disclosure are not limited thereto. The encapsulation layer 136 can be omitted.

The plate member 150 can be configured to cover the display part 130. The plate member 150 can be attached on the display part 130 by an adhesive member 140. The adhesive member 140 can be configured on the base member 110 to surround the display part 130. A first surface 150*a* of the plate member 150 can be coupled (or attached) to the adhesive member 140, or can be directly coupled (or attached) to the adhesive member 140. Accordingly, the display part 130 can be surrounded by the base member 110 and the adhesive member 140, and thus, the display part 130 can be buried or embedded between the base member 110 and the adhesive member 140. For example, a second surface 150*b*, which is opposite to the first surface 150*a*, of the plate member 150 can be a front surface (or a screen) of the display panel 100 exposed at the outside of the display apparatus.

The plate member 150 can protect the display part 130 or the display panel 100 from an external impact and can prevent external water or moisture from penetrating into the light emitting device layer 134*b*. The plate member 150 can compensate for the stiffness of the display panel 100. For example, the plate member 150 can be an encapsulation substrate, an encapsulation plate, a second substrate, or a color filter substrate, but embodiments of the present disclosure are not limited thereto.

The plate member 150 can be configured as a transparent material or a transparent substance. The plate member 150 can be configured as a same material as the base member 110 to have the same transparency (or transmittance) as the base member 110, but embodiments of the present disclosure are not limited thereto.

The adhesive member 140 can be interposed between the display part 130 and the plate member 150 and can be facing-coupled the plate member 150 to the display part 130. For example, the adhesive member 140 can be a transparent adhesive layer or a filler. For example, the adhesive member 140 can include a pressure sensitive adhesive (PSA), an optically cleared adhesive (OCA), or an optically cleared resin (OCR). For example, the adhesive member 140 can include a transparent epoxy material capable of transmitting light, but embodiments of the present disclosure are not limited thereto.

The display panel 100 according to an embodiment of the present disclosure can further include a color filter layer 160 and a light blocking layer 170.

The color filter layer 160 can be provided between the display part 130 and the plate member 170 to overlap the emission region EA of each of the plurality of pixels P. For example, the color filter layer 160 can be provided not to overlap the transmissive region TA of each of the plurality of pixels P. For example, the color filter layer 160 can be provided at a first surface 150*a* of the plate member 150 to overlap the emission region EA. The color filter layer 160 can include a color filter which transmits only a wavelength of a color set in each of the plurality of pixels P. For example, the color filter layer 137 can include a red color filter, a green color filter, and a blue color filter.

The light blocking layer 170 can be configured to define (or divide) the emission region EA and the transmissive region TA of each of the plurality of pixels P. The light blocking layer 170 can be provided at a region (or a boundary region) between the emission region EA and the transmissive region TA of each of the plurality of pixels P. For example, the light blocking layer 170 can be a light blocking pattern or a black matrix. For example, the light blocking layer 170 can be configured at the first surface 150*a* of the plate member 150 to surround the color filter layer 160. For example, the light blocking layer 170 can include an opaque metal material or resin material such as chromium (Cr or CrOx), or can include a light-absorbing material.

The plate member 150 can include the color filter layer 160 and the light blocking layer 170, and thus, the plate member 150 can be a color filter array substrate.

The plate member 150 can include a transmissive portion TP overlapping the transmissive region TA of each of the plurality of pixels P. An adhesive member 140 can be filled into the transmissive portion TP of the plate member 150, but embodiments of the present disclosure are not limited thereto. For example, a separate transparent material layer 145 can be filled into the transmissive portion TP of the plate member 150. The transparent material layer 145 can include a same material as the adhesive member 140.

The display apparatus or the display panel 100 according to an embodiment of the present disclosure can further include a back plate 120.

The back plate 120 can be attached on a rear surface of the base member 110. The back plate 120 can prevent external water or moisture from penetrating into the light emitting device layer **134*b*. The back plate 120 can reinforce the stiffness of the display panel 100**.

The back plate 120 can be configured as a transparent material or a transparent substance. The back plate 120 can be configured as a same material as the base member 110 and the plate member 150 to have the same transparency (or transmittance) as each of the base member 110 and the plate member 150, but embodiments of the present disclosure are not limited thereto.

The display apparatus or the display panel 100 according to an embodiment of the present disclosure can further include a functional film 180.

The functional film 180 can be disposed on the second surface **150*b* of the plate member 150. The functional film 180** according to an embodiment of the present disclosure can include one or more of an anti-reflection layer (or an anti-reflection film), a barrier layer (or a barrier film), a touch sensing layer, and a light path control layer (or a light path control film), but embodiments of the present disclosure are not limited thereto.

The anti-reflection layer can be a polarization layer (or a polarization film) for blocking light which is reflected by a TFT and/or signal lines disposed on the second surface **150*b* of the plate member 150** and again travels to the outside. For example, the anti-reflection layer can include a circular polarization layer (or a circular polarization film). The barrier layer can include a polymer material or a material which is low in a water transmittance, and thus, can prevent the penetration of water or oxygen from the outside. The touch sensing layer can include a touch electrode layer based on a mutual capacitance type or a self-capacitance type, and thus, can output touch data, corresponding to a user touch, through the touch electrode layer. The light path control layer can include a stacked structure where a high refraction layer and a low refraction layer are alternately stacked and can change a path of light incident from each pixel P to minimize a color shift based on a viewing angle.

The vibration member 200 can be configured to vibrate the display panel 100 or the plate member 150. The vibration member 200 can vibrate the display panel 100 or the plate member 150, and thus, can output one or more of a sound, a haptic feedback, and an ultrasound, based on a vibration of the base member 110 and the plate member 150. For example, the vibration member 200 can be a vibrator, a vibration generator, a vibration generating apparatus, a vibration generating device, an active vibration member, a displacement device, a displacement apparatus, a sound generating device, a sound generator, a sound generating apparatus, a film speaker, a piezoelectric film speaker, or a flexible speaker.

The vibration member 200 can be embedded in the display panel 100. For example, the vibration member 200 can be integrated as one body in the display panel 100. For example, the display panel 100 can be a display panel with a vibration apparatus integrated therein. For example, the display panel 100 can be a display panel with a transparent vibration apparatus integrated therein.

The vibration member 200 can include the vibration apparatus 1 according to an embodiment of the present disclosure described above with reference to FIGS. 1 to 4 or the vibration apparatus 2 according to another embodiment of the present disclosure described above with reference to FIGS. 5 and 6. Therefore, repeated descriptions of the vibration member 200 are omitted or provided briefly.

According to an embodiment of the present disclosure, when the vibration member 200 includes the vibration apparatus 2 according to another embodiment of the present disclosure described above with reference to FIGS. 5 and 6, the display panel 100 or the plate member 150 can include first to third vibration regions which respectively overlap or correspond to the first to third regions A1 to A3 of the vibration member 200 illustrated in FIG. 6. Therefore, first to third vibration regions of the display panel 100 or the plate member 150 can respectively vibrate based on vibrations of the first to third regions A1 to A3 of the vibration member 200, and thus, can output one or more of a sound, a haptic feedback, and an ultrasound. For example, the display panel 100 or the plate member 150 can generate or output sounds of different pitched sound bands from one or more of the first to third vibration regions, and thus, can output a stereo sound or a stereophonic sound and can have a sound output characteristic of 2 or more channels.

The vibration member 200 according to an embodiment of the present disclosure can be disposed or interposed between the plate member 150 of the display panel 100 and the functional film 180. The vibration member 200 can be connected to or attached on the second surface **150*b* of the plate member 150 by a transparent adhesive member 300. For example, the second cover member 15 of the vibration member 200 can be connected to or attached on the second surface 150*b* of the plate member 150 by the transparent adhesive member 300, but embodiments of the present disclosure are not limited thereto. For example, the second cover member 15 of the vibration member 200 can be connected to or attached on the second surface 150*b* of the plate member 150 by a transparent adhesive member 300**.

The functional film 180 can be configured to cover the vibration member 200. For example, the functional film 180 can be connected to or attached on the vibration member 200 by a transparent adhesive member 190. Accordingly, the functional film 180 can protect the vibration member 200 from an external impact.

The transparent adhesive member 190 and 300 can include a pressure sensitive adhesive (PSA), an optically cleared adhesive (OCA), or an optically cleared resin (OCR). For example, the transparent adhesive member 190 and 300 can include a transparent epoxy material capable of transmitting light, but embodiments of the present disclosure are not limited thereto.

According to an embodiment of the present disclosure, the plurality of first portions **11*a*1 and the second portion 11*a*2 in the vibration layer 11*a* of the vibration member 200 can have a size corresponding to the emission region EA or the transmissive region TA of the pixel P. Therefore, some of the plurality of first portions 11$a$1 can overlap the emission region EA of the pixel P, and the other thereof can overlap the transmissive region TA of the pixel P. A boundary portion between each of the plurality of first portions 11$a$1 and the second portion 11$a$2 can overlap the light blocking layer 170. Therefore, a transparency (or transmittance) deviation between each of the plurality of first portions 11$a$1 and the second portion 11$a$2 can be dispersed by a lattice-shaped arrangement structure of the plurality of first portions 11$a$1, thereby minimizing or preventing a reduction in visibility caused by a line-shaped stain occurring due to a transparency (or transmittance) deviation between the first portion 11$a$1 and the second portion 11$a$2. Accordingly, the vibration member 200 can vibrate the display panel 100 without decreasing a transparency (or transmittance) of the display panel 100**, and thus, can output one or more of a sound, a haptic feedback, and an ultrasound.

In FIGS. 7 and 8, it is illustrated and described that the vibration member 200 is disposed between the plate member 150 and the functional film 180 of the display panel 100, but embodiments of the present disclosure are not limited thereto.

The vibration member 200 according to another embodiment of the present disclosure can be connected to or disposed at a front surface of the functional film 180. For example, the functional film 180 can be connected to or attached on the second surface 150$b$ of the plate member 150 by the transparent adhesive member 190. The vibration member 200 can be connected to or attached on the front surface of the functional film 180 by the transparent adhesive member 300.

The vibration member 200 according to another embodiment of the present disclosure can be connected to or attached on a rear surface of the back plate 120 of the display panel 100.

The vibration member 200 according to another embodiment of the present disclosure can be connected to or attached on a rear surface of the base member 110 of the display panel 100. For example, the vibration member 200 can vibrate the display panel 100 and can reinforce the stiffness of the display panel 100. Accordingly, the back plate 120 can be omitted.

The display apparatus according to an embodiment of the present disclosure can have transparency (or transmittance), based on the transmissive region TA of each pixel P. In addition, the display apparatus according to an embodiment of the present disclosure can include the vibration member 200 including a vibration apparatus or a transparent vibration apparatus, and thus, can output one or more of a sound, a haptic feedback, and an ultrasound by a vibration of the display panel 100 based on a vibration of the vibration member 200 without a reduction in transparency (or transmittance) of the display panel 100. Moreover, in the display apparatus according to an embodiment of the present disclosure, because the plurality of first portions 11$a$1 having a piezoelectric characteristic are arranged in a lattice shape in the vibration member 200, a transparency (or transmittance) of the display panel 100 can be maintained, and the visual repulsion of a user against the visibility of each of the plurality of first portions 11$a$1 provided at the display panel 100 can be minimized or removed (or improved).

Figure 9A:
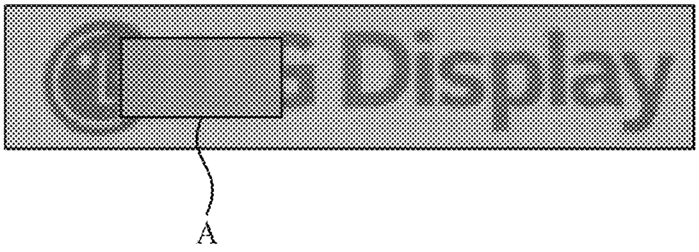
FIG. 9A illustrates a transparency of a single crystalline piezoelectric material according to an experimental example.
Figure 9B:
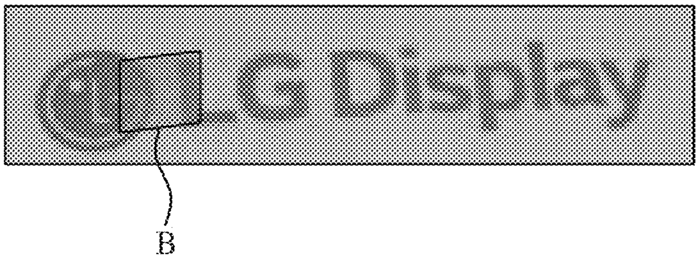
FIG. 9B illustrates a transparency of a surface-processed single crystalline piezoelectric material according to an embodiment of the present disclosure.

FIG. 9A illustrates a transparency of a single crystalline piezoelectric material according to an experimental example. FIG. 9B illustrates a transparency of a surface-processed single crystalline piezoelectric material according to an embodiment of the present disclosure.

Particularly, FIG. 9A is a photograph according to the experimental example where a before-surface-processing single crystalline piezoelectric material is placed on a text and a transparency of the single crystalline piezoelectric material is photographed. FIG. 9B is a photograph according to an embodiment of the present disclosure where the surface-processed single crystalline piezoelectric material is placed on a text and a transparency of the surface-processed single crystalline piezoelectric material is photographed.

As seen in FIGS. 9A and 9B, it can be seen that a transparency of a surface-processed single crystalline piezoelectric material B is higher than that of a single crystalline piezoelectric material A according to the experimental example. For example, in FIG. 9A, it can be seen that an "L"-shape covered by the single crystalline piezoelectric material A of the experimental example is blurredly shown.

On the other hand, in FIG. 9B, it can be seen that an "L"-shape covered by the single crystalline piezoelectric material B of an embodiment of the present disclosure is relatively clearly shown. Therefore, regarding the surface-processed single crystalline piezoelectric material B according to an embodiment of the present disclosure, the diffuse reflection of light or scattering of light at a surface can be minimized or reduced, and thus, a transparency (or transmittance) thereof can be enhanced. Accordingly, the vibration apparatus or the transparent vibration apparatus according to an embodiment of the present disclosure can include the surface-processed single crystalline piezoelectric material, and thus, a transparency (or transmittance) thereof can be enhanced.

Figure 10:
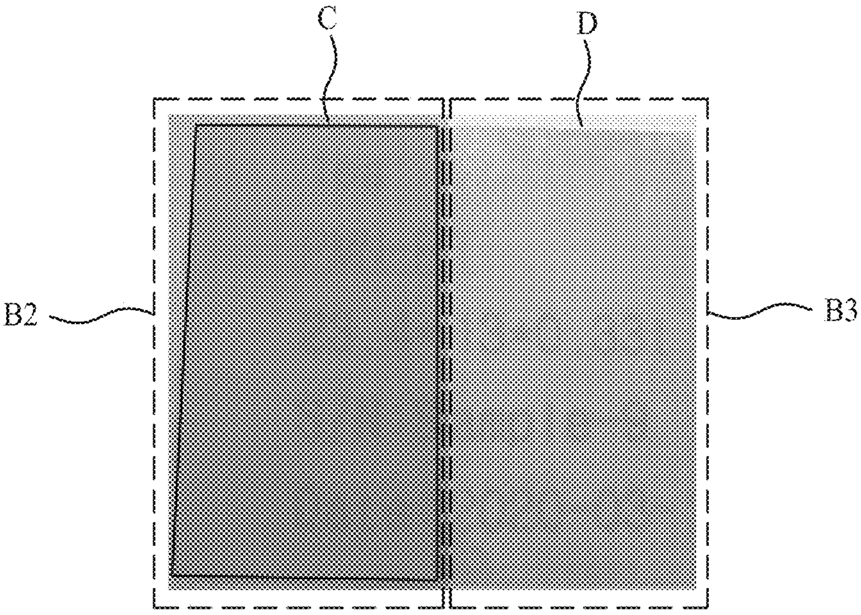
FIG. 10 illustrates a transparency of a single crystalline piezoelectric material according to an experimental example and a transparency of a single crystalline piezoelectric material according to an embodiment of the present disclosure.

FIG. 10 illustrates a transparency of a single crystalline piezoelectric material according to an experimental example and a transparency of a single crystalline piezoelectric material according to an embodiment of the present disclosure.

In FIG. 10, a dotted-line box B2 is a photograph according to the experimental example where a before-AC-poling single crystalline piezoelectric material C is placed on a text and a transparency of the single crystalline piezoelectric material C is photographed, and a dotted-line box B3 is a photograph according to an embodiment of the present disclosure where an AC poling-performed single crystalline piezoelectric material D is placed on a text and a transparency of the single crystalline piezoelectric material D is photographed. In AC poling, a triangular wave of 1 Hz having a voltage level of 10 kV/cm has been applied to a single crystalline piezoelectric material having a thickness of 0.33 mm at 10 cycles.

As seen in FIG. 10, comparing with the experimental example, it can be seen that a transparency of the single crystalline piezoelectric material D according to an embodiment of the present disclosure is relatively high. For example, as seen in the dotted-line box B2 of FIG. 10, it can be seen that an alphabet and a digit covered by the single crystalline piezoelectric material C of the experimental example are blurredly shown and the single crystalline piezoelectric material C of the experimental example is yellowish. On the other hand, as seen in the dotted-line box B3, it can be seen that an alphabet and a digit covered by the single crystalline piezoelectric material D according to an embodiment of the present disclosure are relatively clearly shown. In addition, it can be seen that the degree, to which the single crystalline piezoelectric material D according to an embodiment of the present disclosure is yellowish, is reduced compared to comparing with the experimental example.

Therefore, the single crystalline piezoelectric material D according to an embodiment of the present disclosure can have polarization based on AC poling, and thus, the degree, to which the single crystalline piezoelectric material D according to an embodiment of the present disclosure is yellowish, is reduced and transparency (or transmittance) can be enhanced. Accordingly, the vibration apparatus or the transparent vibration apparatus according to an embodiment of the present disclosure can include the AC poling-performed single crystalline piezoelectric material, and thus, a transparency (or transmittance) thereof can be enhanced.

Figure 11:
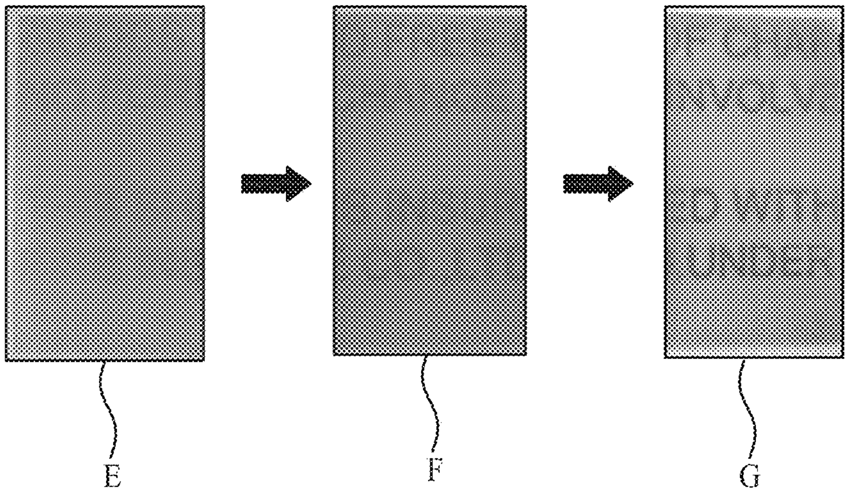
FIG. 11 illustrates transparency before surface processing on a single crystalline piezoelectric material, transparency after the surface processing on the single crystalline piezoelectric material, and transparency after alternating current (AC) poling on a surface-processed single crystalline piezoelectric material.

FIG. 11 illustrates transparency before surface processing on a single crystalline piezoelectric material, transparency after the surface processing on the single crystalline piezoelectric material, and transparency after AC poling on a surface-processed single crystalline piezoelectric material.

In FIG. 11, E is a photograph where transparency before the surface processing on the single crystalline piezoelectric material is photographed, F is a photograph where transparency after the surface processing on the single crystalline piezoelectric material is photographed, and G is a photograph where transparency before the AC poling on the surface-processed single crystalline piezoelectric material is photographed.

Referring to FIG. 11, comparing with a single crystalline piezoelectric material based on the photograph E, it can be seen that a transparency of a single crystalline piezoelectric material based on the photograph F is high. Also, comparing with the single crystalline piezoelectric material based on the photograph F, it can be seen that a transparency of a single crystalline piezoelectric material based on the photograph G is high. Therefore, a single crystalline piezoelectric material according to an embodiment of the present disclosure can be manufactured by surface processing and AC poling, and thus, a transparency (or transmittance) thereof can be more enhanced. Accordingly, the vibration apparatus or the transparent vibration apparatus according to an embodiment of the present disclosure can include a single crystalline piezoelectric material on which surface processing and AC poling have been performed, and thus, can more enhance a transparency (or transmittance) thereof and can vibrate a display panel to output one or more of a sound, a haptic feedback, and an ultrasound, without a reduction in transparency of the display panel.

Figure 12:
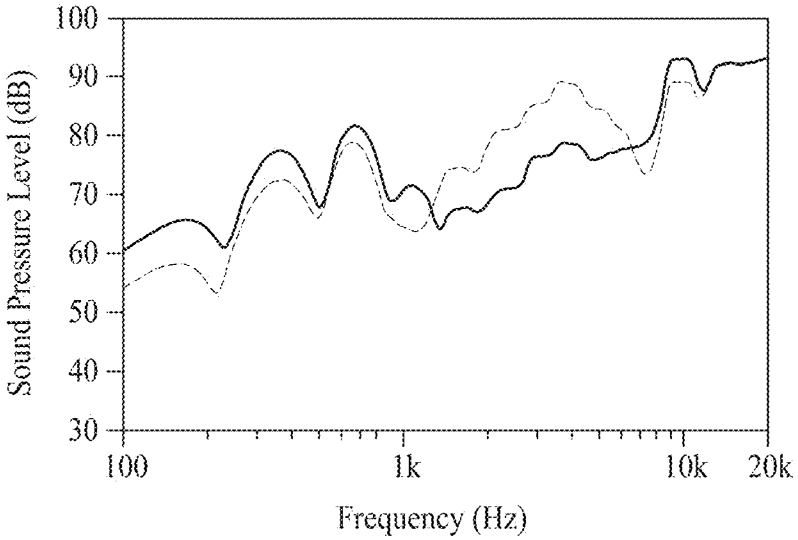
FIG. 12 illustrates an example of a sound output characteristic of a vibration apparatus according to an embodiment of the present disclosure and a sound output characteristic of a vibration apparatus according to an experimental example.

FIG. 12 illustrates an example of a sound output characteristic of a vibration apparatus according to an embodiment of the present disclosure and a sound output characteristic of a vibration apparatus according to an experimental example.

In FIG. 12, the abscissa axis represents a frequency (hertz, Hz), and the ordinate axis represents a sound pressure level (SPL) (decibel, dB). In FIG. 12, a dotted line represents a sound output characteristic according to the experimental example including one single crystalline piezoelectric layer having a size of 60 mm×60 mm, and a thick solid line represents a sound output characteristic according to an embodiment of the present disclosure including a vibration layer where four single crystalline piezoelectric layers having a size of 30 mm×30 mm are arranged in a lattice shape.

As seen in FIG. 12, comparing with the dotted line, in the thick solid line, it can be seen that a sound pressure level characteristic increases in a pitched sound band of about 1.5 kHz or less and a pitched sound band of 6.5 kHz or more. Also, in 200 Hz to 20 kHz, an average sound pressure level of the experimental example can be about 77.4 dB, and an average sound pressure level of an embodiment can be about 76.7 dB. Accordingly, it can be seen that an average sound pressure level of the vibration apparatus or the transparent vibration apparatus according to an embodiment of the present disclosure is similar to an average sound pressure level of a vibration apparatus or a transparent vibration apparatus according to the experimental example.

A vibration apparatus and a display apparatus including the same according to one or more embodiments of the present disclosure are described below.

A vibration apparatus according to one or more embodiments of the present disclosure can comprise a first cover member, a second cover member, and a vibration part between the first cover member and the second cover member. The vibration part can comprise a vibration layer including a plurality of first portions and a second portion disposed between the plurality of first portions, the plurality of first portions including a transparent single crystalline piezoelectric material, and the second portion including a transparent organic material. The vibration part further comprise a first electrode layer at a first surface of the vibration layer, and a second electrode layer at a second surface of the vibration layer being different from the first surface of the vibration layer.

According to one or more embodiments of the present disclosure, the second portion can be disposed to surround lateral surfaces of each of the plurality of first portions.

According to one or more embodiments of the present disclosure, the plurality of first portions can be disposed in a predetermined interval along a first direction and a second direction intersecting with the first direction, on a same plane.

According to one or more embodiments of the present disclosure, each of the plurality of first portions can have a transparency of about 80% or more.

According to one or more embodiments of the present disclosure, a polarization direction formed at each of the plurality of first portions can correspond to a thickness direction of the vibration layer.

According to one or more embodiments of the present disclosure, the single crystalline piezoelectric material can be configured as any one of $\alpha$-$AlPO_4$, $\alpha$-$SiO_2$, $LiNbO_3$, $Tb_2(MoO_4)_3$, $Li_2B_4O_7$, $Bi_{12}SiO_2O$, $Bi_{12}GeO_2O$, PMN-PT, PIN-PMN-PT, PMN-PZT, and PZN-PT.

According to one or more embodiments of the present disclosure, the vibration apparatus can further comprise an adhesive layer between the first cover member and the second cover member to surround the vibration part.

According to one or more embodiments of the present disclosure, the vibration apparatus can further comprise a signal supply member electrically connected to the first electrode layer and the second electrode layer.

According to one or more embodiments of the present disclosure, the signal supply member can comprise a base member, and a plurality of signal lines disposed at the base member and electrically connected to the first electrode layer and the second electrode layer, and a portion of the base member can be accommodated between the first cover member and the second cover member.

According to one or more embodiments of the present disclosure, the vibration layer can comprise a plurality of regions, and sounds of different pitched sound bands can be generate at one or more of the plurality of regions of the vibration layer.

According to one or more embodiments of the present disclosure, the second electrode layer can comprise a plurality of sub-electrode layers respectively overlapping the plurality of regions of the vibration layer.

According to one or more embodiments of the present disclosure, different driving signals can be applied to one or more of the plurality of sub-electrode layers.

According to one or more embodiments of the present disclosure, the vibration apparatus can further comprise a plurality of signal supply members electrically connected to the plurality of sub-electrode layers, respectively.

According to one or more embodiments of the present disclosure, end portions of the plurality signal lines can be separated from each other.

According to one or more embodiments of the present disclosure, a surface of each of the plurality of first portions can have a surface illuminance of about 2 μm or less.

A display apparatus according to one or more embodiments of the present disclosure can comprise a display panel including a plurality of pixels configured to display an image, and a vibration member configured to vibrate the display panel. The vibration member can comprise a vibration apparatus, and the vibration apparatus can comprise a first cover member, a second cover member, and a vibration part disposed between the first cover member and the second cover member. The vibration part can comprise a vibration layer including a plurality of first portions and a second portion disposed between the plurality of first portions, the plurality of first portions including a transparent single crystalline piezoelectric material, and the second portion including a transparent organic material. The vibration part can further comprise a first electrode layer at a first surface of the vibration layer, and a second electrode layer at a second surface of the vibration layer being different from the first surface of the vibration layer.

According to one or more embodiments of the present disclosure, a surface of each of the plurality of first portions in the vibration member can have a surface illuminance of about 2 μm or less.

According to one or more embodiments of the present disclosure, each of the plurality of pixels can include an opening region and a transmissive region.

According to one or more embodiments of the present disclosure, each of the plurality of first portions in the vibration member can have a size corresponding to the opening region or the transmissive region.

According to one or more embodiments of the present disclosure, the display panel can further comprise a light blocking layer disposed between the opening region and the transmissive region of each of the plurality of pixels, and a boundary portion disposed between the plurality of first portions and the second portion in the vibration member can overlap the light blocking layer.

According to one or more embodiments of the present disclosure, the display panel can further comprise a color filter layer in the opening region of each of the plurality of pixels.

According to one or more embodiments of the present disclosure, the display panel can comprise a first substrate, a display part on the first substrate and including the plurality of pixels, and a second substrate on the display part. The vibration member can be connected to the second substrate or the first substrate.

According to one or more embodiments of the present disclosure, the display panel can further include a functional film covering the vibration member.

A vibration apparatus or a transparent vibration apparatus according to one or more embodiments of the present disclosure can be applied to or included a display apparatus. The display apparatus according to one or more embodiments of the present disclosure can be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like.

In addition, the vibration apparatus or the transparent vibration apparatus according to one or more embodiments of the present disclosure can be applied to or included in an organic light-emitting lighting apparatus or an inorganic light-emitting lighting apparatus. When the vibration apparatus or the transparent vibration apparatus is applied to or included in the lighting apparatuses, the lighting apparatuses can act as lighting and a speaker. In addition, when the vibration apparatus or the transparent vibration apparatus according to one or more embodiments of the present disclosure is applied to or included in the mobile apparatuses, or the like, the vibration apparatus or the transparent vibration apparatus can be one or more of a speaker, a receiver, and a haptic device, but embodiments of the present disclosure are not limited thereto.

It will be apparent to those skilled in the art that various modifications and variations can be made in the present disclosure without departing from the scope of the disclosure. Thus, it is intended that the present disclosure covers the modifications and variations of this disclosure provided that within the scope of the claims and their equivalents.

What is claimed is:

1. A display apparatus, comprising:

a display panel including a plurality of pixels configured to display an image; and a vibration member configured to vibrate the display panel, wherein the vibration member comprises:

a first cover member;

a second cover member; and a vibration part disposed between the first cover member and the second cover member, wherein the vibration part comprises:

a vibration layer including a plurality of first portions and a second portion disposed between the plurality of first portions, the plurality of first portions including a transparent single crystalline piezoelectric material and the second portion including a transparent organic material;

a first electrode layer disposed at a first surface of the vibration layer; and a second electrode layer disposed at a second surface of the vibration layer being different from the first surface of the vibration layer, wherein each of the plurality of pixels includes an opening region and a transmissive region, and wherein each of the plurality of first portions in the vibration member has a size corresponding to the opening region or the transmissive region.

2. The display apparatus of claim 1, wherein the second portion is disposed to surround lateral surfaces of each of the plurality of first portions.

3. The display apparatus of claim 1, wherein the plurality of first portions are disposed in a predetermined interval along a first direction and a second direction intersecting with the first direction, on a same plane.

4. The display apparatus of claim 1, wherein each of the plurality of first portions has a transparency of about 80% or more.

5. The display apparatus of claim 1, wherein a polarization direction formed at each of the plurality of first portions corresponds to a thickness direction of the vibration layer.

6. The display apparatus of claim 1, wherein the transparent single crystalline piezoelectric material includes any one of $\alpha$-$AlPO_4$, $\alpha$-$SiO_2$, $LiNbO_3$, $Tb_2(MoO_4)_3$, $Li_2B_4O_7$, $Bi_{12}SiO_{20}$, $Bi_{12}GeO_{20}$, PMN-PT, PIN-PMN-PT, PMN-PZT, and PZN-PT.

7. The display apparatus of claim 1, further comprising an adhesive layer disposed between the first cover member and the second cover member to surround the vibration part.

8. The display apparatus of claim 1, further comprising a signal supply member electrically connected to the first electrode layer and the second electrode layer.

9. The display apparatus of claim 8, wherein the signal supply member comprises:

a base member; and a plurality of signal lines disposed at the base member and electrically connected to the first electrode layer and the second electrode layer, and wherein a portion of the base member is accommodated between the first cover member and the second cover member.

10. The display apparatus of claim 9, wherein end portions of the plurality of signal lines are separated from each other.

11. The display apparatus of claim 1, wherein the vibration layer comprises a plurality of regions, and wherein sounds of different pitched sound bands are generated at one or more of the plurality of regions of the vibration layer.

12. The display apparatus of claim 11, wherein the second electrode layer comprises a plurality of sub-electrode layers respectively overlapping the plurality of regions of the vibration layer.

13. The display apparatus of claim 12, wherein different driving signals are applied to one or more of the plurality of sub-electrode layers.

14. The display apparatus of claim 12, further comprising a plurality of signal supply members electrically connected to the plurality of sub-electrode layers respectively.

15. The display apparatus of claim 1, wherein a surface of each of the plurality of first portions has a surface illuminance of about 2 μm or less.

16. The display apparatus of claim 1, wherein a surface of each of the plurality of first portions in the vibration member has a surface illuminance of about 2 μm or less.

17. The display apparatus of claim 1, wherein the display panel further comprises a light blocking layer disposed between the opening region and the transmissive region of each of the plurality of pixels, and wherein a boundary portion disposed between the plurality of first portions and the second portion in the vibration member overlaps the light blocking layer.

18. The display apparatus of claim 1, wherein the display panel comprises:

a first substrate;

a display part on the first substrate and including the plurality of pixels;

a second substrate on the display part, wherein the vibration member is connected to the second substrate or the first substrate.

19. The display apparatus of claim 18, wherein the display panel further includes a functional film covering the vibration member.

* * * * *